(12) United States Patent
Sasaki

(10) Patent No.: US 7,012,908 B2
(45) Date of Patent: Mar. 14, 2006

(54) CDMA BASE TRANSCEIVER SYSTEM

(75) Inventor: Masayuki Sasaki, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 958 days.

(21) Appl. No.: 09/942,847

(22) Filed: Aug. 31, 2001

(65) Prior Publication Data

US 2002/0027892 A1   Mar. 7, 2002

(30) Foreign Application Priority Data

Sep. 5, 2000   (JP) .............................. 2000-268027

(51) Int. Cl.
   *H04B 7/216*   (2006.01)
(52) U.S. Cl. ..................... 370/335; 370/342; 455/435.2
(58) Field of Classification Search ................ 370/320, 370/335, 342, 441, 319, 321, 377, 347, 328, 370/329, 341, 431; 455/422.1, 432.1, 433, 455/435.1, 435.2, 450

See application file for complete search history.

(56) References Cited

U.S. PATENT DOCUMENTS

| | | | |
|---|---|---|---|
| 5,640,416 A |  | 6/1997 | Chalmers |
| 5,778,022 A | * | 7/1998 | Walley ........................ 375/152 |
| 6,223,030 B1 |  | 4/2001 | Van Den Heuvel et al. |
| 6,307,877 B1 | * | 10/2001 | Philips et al. ................ 375/130 |
| 6,400,966 B1 | * | 6/2002 | Andersson et al. .......... 455/561 |
| 6,801,564 B1 | * | 10/2004 | Rouphael et al. ............ 375/142 |
| 2002/0196754 A1 | * | 12/2002 | Lugil et al. .................. 370/335 |

FOREIGN PATENT DOCUMENTS

WO   96/14719   5/1996

OTHER PUBLICATIONS

Tuttlebee, W. H. W., *Software Radio Technology: A European Perspective*, IEEE Communications Magazine, IEEE Service Center. Piscataway, N.J. US, vol. 37, No. 2, Feb. 1999, pp. 118-123, XP000804514.
Mitola, J., *Technical Challenges in the Globalization of Software Radio*, IEEE Communications Magazine, IEEE Service Center. Piscataway, N.J, US, vol. 37, No. 2, Feb. 1999, pp. 84-89, XP000804508.
Chiassarini, G., et al., entitled *"Design Aspects of Digital Modems for the Forecoming Demonstrations of Mobile Systems Operating at SHF/EHF"*, Proceedings of the 2nd European Workshop on Mobile and Personal Satellite Communications, Oct. 9, 1996, pp. 165-179, (XP010509215).

\* cited by examiner

*Primary Examiner*—Ajit Patel
(74) *Attorney, Agent, or Firm*—Wenderoth, Lind & Ponack,L.L.P.

(57)   ABSTRACT

The present invention uses a CDMA base transceiver system that performs wireless communications through the use of a CDMA method. The invention thereby copes with a plurality of communication methods, through the use of that system, through an efficient construction of the system, simply by changing the software even if making no changes of, for example, the hardware. For example, a base band part is constructed by using an FPGA for processing a chip-rate signal through FPGA program data and a DSP for processing a symbol-rate signal through DSP program data. Through the use of program data setting means, it is possible to change the FPGA program data used by the FPGA and the DSP program data used by the DSP to program data that corresponds to a different type of communication method.

5 Claims, 7 Drawing Sheets

CDMA BASE TRANSCEIVER SYSTEM

BACKGROUND OF THE INVENTION

1. Field of the Invention

The present invention relates to a CDMA base transceiver system for performing wireless communications through the use of a CDMA (Code Division Multiple Access) method. More particularly, the present invention relates to a CDMA base transceiver system, etc. that, for example, even when not changing a relevant hardware, can cope with a plurality of communication methods by changing the software of a field programmable gate array (FPGA: Field Programmable Gate Array) or digital signal processor (DSP: Digital Signal Processor).

2. Description of the Related Art

For example, nowadays, in a 3rd GPP (Third Generation Partnership Project), the standardization of the specification that regards an air interface (the interface for realization of a communication method) has been studied. However, finally, such specifications will not be completely unified into one type of communication method, but a plurality of types of communication methods such as a wide-band CDMA (W-CDMA: Wide-band-CDMA) method or a multi-carrier CDMA (MC-CDMA: Multi-carrier-CDMA) method (CDMA-2000) will be adopted as a standard world-wide method. Incidentally, the 3rd GPP is a joint project for IMT-2000 technology specification development, and has been studying a third-generation mobile communication (portable telephone) system.

For this reason, as, for example, a base transceiver system (BTS: Base Transceiver System) equipped to a portable-telephone system or the like, it becomes necessary for a system to be developed which corresponds to a different standard specification that has been determined for each communication method. As an example, in our country, it has been almost determined that both of the W-CDMA method and the MC-CDMA method will be adopted. In view of this, the degree of the above-described necessity is very high.

Here, a construction example of a conventional CDMA base transceiver system (BTS system) is illustrated.

A construction example of a CDMA base transceiver system 111 is illustrated in FIG. 7. This CDMA base transceiver system 111 is connected to a higher in-order system (higher-in-order-than-BTS system) 112 via a bi-directional wire transmission path 113. It is to be noted that the higher in-order system 112 performs transmission/reception of a signal between itself and the CDMA base transceiver system 111 via the wire transmission path 113 to thereby perform control, etc. of the CDMA base transceiver system 111.

An example of the operation of the CDMA base transceiver system 111 illustrated in FIG. 7 will now be explained.

Two antennas A11 and A12 wirelessly transmit a transmission signal input from a duplex part 121, and output a signal (reception signal) that has been wirelessly received to the duplex part 121. In this example, the antennas A11 and A12 each transmit or receive a wireless signal (diffusion signal) between itself and a mobile station system (MS: Mobile Station), etc.

The duplex part 121 separates a transmission signal and a reception signal from each other. Thereby, the duplex part 121 enables the transmission or reception of a wireless signal through the use of the common antennas A11, A12.

An amplification part 122 is constructed by using an amplifier. The amplification part 122 amplifies a transmission signal input from a wireless transmission/reception part 124, and outputs this transmission signal to the antennas A11 and A12 via the duplex part 121.

A low noise amplification part 123 is constructed by using a low noise amplifier (LNA: Low Noise Amplifier). The low noise amplification part 123 amplifies a reception signal input from the antennas A11 and A12 via the duplex part 121 and outputs the reception signal to the wireless transmission/reception part 124.

The wireless transmission/reception part (TRX part) 124 performs orthogonal modulation of the transmission signal (I signal and Q signal) with respect to the diffusion processing that has been performed by a base band part 125, whereby the frequency of the transmission signal is therefore in base band. The wireless transmission/reception part 124 thereby converts the transmission signal to a transmission signal having a wireless frequency band and outputs this signal to the amplification part 122. The wireless transmission/reception part 124 also performs quasi-synchronous detection of the reception signal that is input from the low noise amplification part 123 and that has a wireless frequency band. The wireless transmission/reception part 124 thereby converts that reception signal to a reception signal (I signal and Q signal) whose frequency is in base band, and outputs this signal to the base band part 125.

The base band part 125 performs the following pieces of processing with respect to the transmission signal (down signal) that is input from a transmission path signal switching function part 131: error correction coding, framing, data modulation processing, and diffusion modulation processing. Also, the base band part 125 performs the following pieces of processing with respect to the reception signal (up signal) that is input from the wireless transmission/reception part 124: inverse diffusion modulation processing, chip synchronization processing, maximum-ratio-composite-signal processing, error correction decoding, and multiplex separation processing.

A text function part 126 confirms the normality of the intra-system transmission while monitoring it.

A call-process monitor control part 127 performs transmission or reception of a call-process control signal between itself and the higher in-order system 112, and executes the following pieces of processing: wireless-line management processing, wireless-line setting/resetting, call-process monitor processing, and call-control processing.

A maintenance monitor control part 128 transmits or receives a maintenance monitor control signal between itself and an external operation system (OPS) via the higher in-order system 112. The maintenance monitor control part 128 thereby executes operation management processing and state monitor control processing of the BTS system.

A download part 129 causes the following renewals to be externally controlled: the renewal of an application software (AP) stored in a ROM (Read Only Memory) equipped within the call-process monitor control part 127 and the renewal of an application software stored in a ROM equipped within the maintenance monitor control part 128.

A memory medium 130 is constructed of, for example, a memory card that is freely detachable from the download part 129. The memory medium 130 stores therein the application software for being stored into the ROM of the call-process monitor control part 127 as well as the application software for being stored into the ROM of the maintenance monitor control part 128.

Here, the application software stored in the memory medium 130 is read by the download part 129. Then, the application software is transmitted (transferred) by an intra-system bus signal S31 from the download part 129 to the call-process monitor control part 127 or to the maintenance monitor control part 128.

The transmission path signal switching function part 131 switches each of processing parts, which are to be connected to a transmission path interface part 132, between the base band part 125, the test function part 126, the call-process monitor control part 127, and the maintenance monitor control part 128. The transmission path signal switching function part 131 thereby performs connection changeover for a signal (intra-system signal) that is transmitted or received between the processing parts within the system.

The transmission path (High Way) interface part 132 has a function to process the terminal end of the wire transmission path 113. The transmission path interface part 132 thereby inputs/outputs a signal between itself and the transmission path signal switching function part 131, and also inputs/outputs a signal between itself and the wire transmission path 113.

A construction example of the base band part 125 is illustrated in FIG. 8. The base band part 125 is equipped with a modulation/demodulation part 141 that is constructed of an LSI (Large Scale Integrated Circuit), a channel CODEC (Coder-Decoder) part 142 that is constructed of an LSI, a transmission/reception data input/output part 143, an oscillator 144, and a control part 145.

The modulation/demodulation part 141 includes the following processing parts that each operate as follows.

An A/D (Analog/Digital) conversion part 151 inputs a reception signal (I signal and Q signal) that is output from the wireless transmission/reception part 124 as an analog signal. The A/D conversion part 151 then converts that reception signal to a digital signal and outputs this signal to a matched filter 161 of a searcher part 153 or to each of correlators F1 to FN of a finger part 154.

A matched filter correlator control part 152 controls a diffusion code (diffusion code) that is used in the matched filter 161 of the searcher part 153 and a diffusion code that is used in the correlators F1 to FN of the finger part 154.

The searcher part 153 includes the matched filter 161, a pilot synchronous detection part 162, a profile memory bank 163, and a path detection part 164. The searcher part 153 detects the path of the reception signal (a wireless carrier frequency signal that is transmitted from a mobile station system and comes on into the base transceiver system) that is input from the A/D converter part 151 and notifies the detected result to the finger part 154.

Specifically, the matched filter 161 gets, while making different from each other multiplication timing between the reception signal (in this example a pilot signal portion) and the diffusion code signal, the correlation value between that reception signal and that diffusion code signal. Using this result, the pilot synchronous detection part 162 synchronously detects the pilot signal. Also, the profile memory bank 163 stores therein the obtained correlation value result of the matched filter 161 and the synchronous-detected result of the pilot synchronous detection part 162. Using those stored contents, the path detection part 164 detects the path, and the detected path result is notified to the finger part 154.

The finger part 154 includes a plurality of (e.g. an N number of pieces) signal processing systems #1 to #N. According to the detected path result that is notified from the searcher part 153, the finger part 154 demodulates the reception signal for each path with the use of each relevant signal processing system #1 to #N. The finger part 154 outputs the demodulated result to a composer part 155.

Specifically, the respective signal processing systems #1 to #N each are constructed of one correlator F1 to FN which is equipped with a diffusion code generator (CG: Code Generator), one piece of memory G1 to GN, and one piece of synchronous detection part H1 to HN. For each path detected by the searcher part 153, each correlator F1 to FN performs multiplication between the reception signal input from the A/D conversion part 151 and the diffusion code, and thereby performs inverse diffusion and gets the correlation value between that reception signal and that diffusion code signal. Each memory G1 to GN stores therein the thus-inverse-diffused result (the correlation value) and, according to this stored content, each synchronous detection part H1 to HN performs synchronous detection of the post-inverse-diffusion reception signal. Then, the synchronous detection part H1 to HN outputs the synchronous-detected result to the composer part 155.

The composer part 155 composes the synchronous-detected results corresponding to a plurality of paths that are input from the finger part 154 with the use of, for example, "a maximum-ratio composing method". The composer part 155 outputs the composed result to a physical frame separation part 171 as a final reception signal. Further, the composer part 155 detects a signal power/interference power ratio (SIR: Signal-to-Interference-Ratio) with regard to the composed result. According to the detected result, the composer part 155 generates a transmission power control (TPC: Transmission Power Control) bit for controlling the transmission power and outputs this transmission power control bit to a transmission frame generation part 156.

The transmission frame generation part 156 generates transmission frames by the use of the transmission signal input from a physical frame multiplexing part 174 of the channel CODEC part 142. Then, the transmission frame generation part 156 outputs the thus-generated transmission frame to a diffusion modulation part 158. Further, the transmission frame generation part 156 controls the transmission power according to the transmission power control bit input from the composer part 155.

A diffusion code generation part 157 generates a diffusion code according to the instruction from the control part 145. The diffusion code generation part 157 then outputs the thus-generated diffusion code to the diffusion modulation part 158. It is to be noted that there can also be a construction wherein the code that is generated in the diffusion code generation part 157 is supplied as an inverse diffusion code to the searcher part 153 or the finger part 154.

The diffusion modulation part 158 performs diffusion modulation of the transmission frame signal (framed transmission signal) input from the transmission frame generation part 156 by the use of the diffusion code input from the diffusion code generation part 157. The diffusion modulation part 158 then outputs the diffusion-modulated transmission frame signal to a D/A conversion part 159.

The D/A converter part 159 converts the diffusion-modulated) transmission frame that is input as a digital signal from the diffusion modulation part 158 to an analog signal. The D/A converter 159 then outputs the post-conversion signal to the wireless transmission/reception part 124 as a transmission signal (I signal and Q signal).

The matched filter correlator control part 152, the composer part 155, the transmission frame generation part 156, the diffusion code generation part 157, and a bus interface (BUS I/F) part 160 equipped within the modulation/demodulation part 141 are each connected to a base band LSI-interior bus B1.

The bus interface part 160 has an interface function between the base band LSI-interior bus B1 and the base band bus 13 to thereby connect these two buses B1 and B13 to each other.

In the channel CODEC part 142, the respective processing parts perform the following operations.

The physical frame separation part 171 separates a physical channel from the reception signal (the composed result) input from the composer part 155 of the modulation/demodulation part 141. Then, the physical frame separation part 171 outputs the post-separation reception signal to the decoder part 172.

The decoder part 172 performs de-interleave processing or error correction decoding with respect to the reception signal input from the physical separation part 171. Then, the decoder part 172 outputs the reception signal after those pieces of processing to the transmission/reception data input/output part 143 in units of a transport channel.

The coder part 173 performs de-interleave processing or error correction coding with respect to the transmission signal input from the transmission/reception data input/output part 143 in units of a transport channel. Then, the coder part 173 outputs the transmission signal after those pieces of processing to the physical frame multiplexing part 174.

The physical frame multiplexing part 174 performs mapping into physical channels of the transmission signal input from the coder part 173. Then, the physical frame multiplexing part 174 outputs the post-mapping transmission signal to the transmission frame generation part 156 of the modulation/demodulation part 141.

The physical frame separation part 171, the decoder part 172, the coder part 173, the physical frame multiplexing part 174, and a bus interface part 175 equipped within the channel CODEC part 142 are each connected to a channel CODECLSI-interior bus B12.

The bus interface part 175 has an interface function between the channel CODECLSI-interior bus B12 and the base band bus B13 and connects these two buses to each other.

In the transmission/reception data input/output part 143, between itself and the decoder part 172 or the coder part 173 of the channel CODEC part 142, input/output control is performed of the data (reception signal or transmission signal) that is handled in units of a transport channel. Also, the transmission/reception data input/output part 143 has an interface function between itself and the base band part 125 or transmission path signal switching part 131. The transmission/reception data input/output part 143 thereby inputs or outputs an intra-system signal (reception signal or transmission signal) between itself and the transmission path signal switching function part 131.

The oscillator 144 oscillates a clock signal for causing operation of the modulation/demodulation part 141 and supplies this clock signal to the modulation/demodulation part 141. Incidentally, in, for example, the W-CDMA/TDD method or W-CDMA/FDD method, a clock signal whose frequency has a value that is (n) times (the (n) represents an integer of 1 or more) as great as 3.84 MHz is oscillated. On the other hand, in, for example, the multi-carrier CDMA method, a clock signal whose frequency has a value that is (m) times (the (m) represents an integer of 1 or more) as great as 1.2288 MHz is oscillated.

The control part 145 has a base band control part 181 that is constructed of, for example, an MPU (Micro Processing Unit), memory, etc. Through the intermediary of the base band bus B13, the modulation/demodulation part 141, channel CODEC part 142, etc are controlled.

The base band bus B13 has connected thereto the modulation part 141, channel CODEC part 142, etc.

Next, examples of the conventional techniques are shown below.

In Japanese Patent Application Laid-Open Publication No. Hei-11-220413 that concerns "Wireless Communication Method", there is described the following digital communication system technique. The technique is directed to re-programming, for example, a programmable logic device (PLD) that is a programmable device to thereby enable a re-configuration of it to be performed.

In Japanese Patent Application Laid-Open Publication No. Hei-11-346383 that concerns "Wireless Transmission System", there is described the following technique. The technique is directed to having a DSP that has a general-purpose circuit therein that can be driven by only making use of, for example, a difference portion information (e.g. coefficient information of a device the stored contents of that are changed). The technique thereby enables one wireless terminal to correspond to a plurality of wireless communication methods through the alteration of that difference portion information.

In Japanese Patent Application Laid-Open Publication No. 2000-20425 that concerns "Method of Renewing Stored Contents of Terminal Apparatus in Communication Network", the following terminal apparatus technique is described. Stored in a reloadable non-volatile storage device such as a flash ROM is a boot program for DSP or a configuration program for FPGA. Thereby, the terminal apparatus renews the boot program or the configuration program.

In Japanese Patent Application Laid-Open Publication No. 2000-106694 that concerns "Wireless Communication Apparatus and Wireless Communication System", the following technique is described. In a software wireless communicator enabling transmission/reception corresponding to a different wireless communication method through a change of the software, the software is changed for FPGA, DSP, or MPU. Thereby, the communicator is made to cope with a different wireless communication system.

In Japanese Patent Application Laid-Open Publication No. Hei-11-346186 that concerns "Mobile Wireless Terminal", the following technique is described. In a mobile wireless terminal based on the utilization of a software radio, for example, software for DSP is loaded down. Thereby, it is made possible to change a setting for modulation/demodulation processing, etc.

In Japanese Patent Application Laid-Open Publication No. Hei-11-55147 that concerns "Wireless Communicator", the following technique is described. In a wireless communicator that is detachably equipped with a module radio part having a transmission/reception function for a radio signal, by changing the radio module, the communicator is made to cope with a plurality of communication systems.

In Japanese Patent Application Laid-Open Publication No. Hei-11-274997 that concerns "Wireless Communicator", the following technique is described. From a storage device having a plurality of programs stored therein concerning the communication protocol, any one of the programs is recorded into an EEPROM and the recorded program is executed by DSP. It is thereby made possible for the wireless communicator to cope with a change in the system protocol or an increase in the version.

As shown in the above-described conventional examples, studies or the like have conventionally been made of the following technique. Namely, through changing the program for DSP, etc. equipped to the wireless communicator, this wireless communicator has been attempted to cope with a different wireless communication system. However, regarding the CDMA base transceiver system in which a CDMA method is adopted, no sufficient studies or the like have yet been made of the concrete circuit construction of, especially, the base band part of that system.

SUMMARY OF THE INVENTION

The present invention has been made in view of the above-described existing circumstances. Accordingly, an object of the present invention is to provide a CDMA base transceiver system that, even when, for example, not changing the relevant hardware, can be made to cope with a plurality of communication systems through changing the software for FPGA or DSP, a program data setting method regarding such a CDMA base transceiver system, or a base transceiver system providing system for providing such a base transceiver system.

To attain the above-described object, the CDMA base transceiver system according to the present invention is equipped with an FPGA for processing a signal at a chip rate through the use of FPGA program data, and a DSP for processing a signal at a symbol rate through the use of DSP program data. Thereby, in the CDMA base transceiver system of the present invention, that is program data setting means sets the FPGA program data used by the FPGA and the DSP program data that is used by the DSP, whereby wireless communication is performed by using a CDMA method.

Here, in the wireless communication performed by using the CDMA method, in general, a transmission side diffuses a signal that is an object to be transmitted through the use of a diffusion code to thereby perform the wireless communication of the diffusion signal. A reception side inverse-diffuses the diffusion signal it has wirelessly received through the use of a diffusion code (the same as that diffusion code). The reception side thereby receives the post-inverse-diffusion signal. Therefore, the wireless communicator (here, the CDMA base transceiver system) that adopts the CDMA methodprocesses the signal that is not diffused at a symbol rate, while the wireless communicator processes the signal that is diffused (the diffusion signal) at a chip rate. On this account, in the present invention, the signal is processed at a chip rate by the FPGA that suits the signal processing to be performed at a chip rate which is higher than the symbol rate. On the other hand, the signal is processed at a symbol rate by the DSP that suits the signal processing to be performed at a symbol rate which is lower than the chip rate.

Incidentally, in general, the chip rate is a speed that corresponds to an inverse number of the time width corresponding to a 1-chip portion of the diffusion code consisting of, for example, a plurality of chips. The symbol rate is a speed that corresponds to an inverse number of the time width corresponding to a 1-symbol portion (1 diffusion-code portion), for example.

Also, the FPGA or the DSP, in general, has program data set therein for causing an operation of the FPGA or the DSP, thereby operating the FPGA or the DSP according to that program data. Thereby, various kinds of signal processing can be executed.

Accordingly, the CDMA base transceiver system according to the present invention can achieve an increase in the efficiency of the signal processing through a construction using the FPGA and the DSP. Simultaneously, while setting FPGA program data or DSP program data corresponding to each of various kinds of communication methods, for example, the CDMA base transceiver system can execute signal processing corresponding to each of various kinds of communication methods. Namely, in the CDMA base transceiver system according to the present invention, even when, for example, not changing the relevant hardware, the system can cope with a plurality of communication methods through changing the software for FPGA or the DSP.

Here, as the communication method (for program data) that is set in the CDMA base transceiver system, as a concrete example, the W-CDMA method or the multi-carrier CDMA method is used. However, the present invention is not limited thereto and permits the use of various kinds of CDMA methods.

Further, as the FPGA program data referred to in the present invention, the FPGA program data includes various kinds of data if it is data used for operating the FPGA. Concretely, the FPGA program data is not always limited to data that is included as the program itself. The FPGA program data may be, for example, data (parameters such as numeric values) that the program refers to, or data for reloading (part of) the program, or the like.

Further, as the DSP program data referred to in the present invention, if it is data used for operating the DSP, the DSP program data includes various kinds of data if it is used for operating the DSP. Concretely, the DSP program data is not always limited to data that is included as the program itself. The DSP program data may be, for example, data (parameters such as numeric values) that the program refers to, or data for reloading (part of) the program, or the like.

Also, the mode in which to set the FPGA program data or DSP program data includes the following: a mode in which to initially set program data to the FPGA or DSP having no program data set therein, a mode in which to set program data as different from the program data to the FPGA or DSP having this program data already set therein (in other words to reload the program data), and so on.

Also, the CDMA base transceiver system according to the present invention, as an embodiment, is equipped with memory connection means that is connected to an external memory. On the other hand, program data setting means reads out the program data (for FPGA or DSP) stored in the external memory connected thereto by the memory connection means to thereby perform setting of that program data.

Accordingly, it is possible to prepare the external memory having the program data stored therein corresponding to various kinds of communication methods. By making this preparation, it is possible to set (the program data corresponding to) various kinds of communication methods to the CDMA base transceiver system.

Here, as the external memory, various kinds of memories such as a memory card may be used.

Also, the memory connection means can be constructed by using input/output terminals for being directly connected to the input/output terminals provided on, for example, the external memory. The memory connection means can also be constructed by using a communication function for being connected to, for example, the external memory through (wire or wireless) communication.

Also, in the CDMA base transceiver system according to the present invention, as a concrete mode of example, the program data setting means set the program data (for FPGA or DSP) corresponding to a communication method which is selected as follows from a plurality of communication methods including the following. Namely, that communication method is selected, for example, by the user, or is selected automatically, for example, by the CDMA base transceiver system. A plurality of communication methods include two or more kinds of communication methods of the W-CDMA/TDD (Time Division Duplex) method, the W-CDMA/FDD (Frequency Division Duplex) method, and the multi-carrier CDMA method. Further, the FPGA and DSP each process a signal according to such (set) communication method.

Here, the number of a plurality of communication methods each able to be set to the CDMA base transceiver system may be a variety of values, while the individual communication methods included in those communication methods may be a variety of communication methods.

Also, (a plurality of) program data corresponding to a plurality of communication methods each able to be set to the CDMA base transceiver system may all be stored in the memory within the CDMA base transceiver system. Alternatively, all of those program data may be stored in a memory outside the CDMA base transceiver system. As another alternative, part of those program data may be stored in the memory within the CDMA base transceiver system while the rest of the program data may be stored in the memory outside the CDMA base transceiver system.

Also, the CDMA base transceiver system according to the present invention includes the base band part that is constructed by using the FPGA for processing a signal through the use of the FPGA program data, and the DSP for processing a signal through the use of the DSP program data. Thereby, through the use of the program data renewing means, the FPGA program data that is used by the FPGA and the DSP program data that is used by the DSP are each renewed to the program data corresponding to a different type of communication method. Thereby, wireless communication is performed through the use of the CDMA method.

Accordingly, through constructing the base band part with the use of the FPGA and DSP, it is possible to achieve an increase in the efficiency of the signal processing. Simultaneously, even when, for example, not changing the hardware, it is possible to cope with a plurality of communication methods by changing the software for the FPGA or DSP.

Incidentally, as a preferred embodiment, the base band part is preferably constructed by using the FPGA for processing a signal at a chip rate, and the DSP for processing a signal at a symbol rate as described above. As a more preferable embodiment, it is better to construct in such a form as to execute through the FPGA all pieces of (communication) signal processing at a chip rate that is executed in the base band part. On the other hand, it is better to construct in such a form as to execute through the DSP all pieces of (communication) signal processing at a symbol rate that is executed in the base band part.

Also, in the CDMA base transceiver system according to the present invention, as an embodiment, clock means supplies a clock (a chip-rate clock) whose frequency corresponds to each of the chip rates corresponding to a plurality of communication methods that are each changeable by the program data changing means. Simultaneously, the clock means supplies a clock (a symbol-rate clock) whose frequency corresponds to each of the symbol rates corresponding to a plurality of the communication methods.

Here, the number of a plurality of communication methods each able to be changed by the program data changing means may be a variety of values, while the individual communication methods included in those communication methods may be a variety of communication methods.

Also, as a construction for supplying a chip-rate clock signal whose frequency corresponds to each of the chip rates corresponding to a plurality of communication methods, it is possible not only to construct in the following form. Namely, in such a form as to, for example, cause the oscillation of a clock signal whose frequency, for each communication method, corresponds to its relevant chip rate. However, it is also possible to construct in the following form. Namely, in such a form as to cause the oscillation of a clock signal whose frequency has the value of a common multiple of the frequency values corresponding to the chip rates corresponding to the respective communication methods included in a plurality of communication methods, for example, and to commonly use that clock signal with respect to a plurality of those communication methods.

Similarly, as a construction for supplying a symbol-rate clock signal whose frequency corresponds to each of the symbol rates corresponding to a plurality of communication methods, it is possible not only to construct in the following form. Namely, in such a form as to, for example, cause the oscillation of a clock signal whose frequency, for each communication method, corresponds to its relevant symbol rate. However, it is also possible to construct in the following form. Namely, in such a form as to cause the oscillation of a clock signal whose frequency has the value of a common multiple of the frequency values corresponding to the symbol rates corresponding to the respective communication methods included in a plurality of communication methods, for example, and to commonly use that clock signal with respect to a plurality of those communication methods.

Incidentally, as the chip-rate clock and the symbol-rate clock, it is certainly possible to supply each of them with the use of a (different) clock signal that has been generated through mutually independent oscillation. However, as a preferred mode of example, it is also possible to supply by generating the chip-rate clock and the symbol-rate clock through the use of a common clock signal, for example.

As an embodiment, in the CDMA base transceiver system according to the present invention, the clock means causes the following clock signal to oscillate (for example from an oscillator). Namely, a clock signal whose frequency has the value of a common multiple of the frequency corresponding to the chip rate of the W-CDMA method (W-CDMA/TDD method or WCDMA/FDD method) and the chip rate of the multi-carrier CDMA method. Thereby, the clock means supplies the chip-rate clock and the symbol-rate clock.

This form of construction is preferable because it enables supplying a clock corresponding to each of a plurality of communication methods by the use of a common clock signal.

Here, as the above-described common multiple, for example, a least common multiple may be used, or another common multiple may be used.

Also, the symbol rate ordinarily becomes (1/integer) times as high as the chip rate. Therefore, by making the speed of the chip-rate clock signal (1/integer) times as high, it is possible to generate a clock signal whose rate is that of the symbol rate.

Also, in the present invention, there is provided a method of setting program data regarding the above-described CDMA base transceiver system.

Specifically, in the program data setting method of the present invention, there is provided the base band part that is constructed by using an FPGA for processing a signal through the use of FPGA program data, and a DSP for processing a signal through the use of DSP program data. This method thereby sets the program data (for FPGA or DSP) of the CDMA base transceiver system performing wireless communication through the use of the CDMA method as follows.

Namely, the program data (for FPGA or DSP) is set according to an instruction input from the user, or an instruction input from an external device.

Accordingly, corresponding to the instruction from the user or external device, it is possible to initially set the program data corresponding to each of a variety of communication methods to the CDMA base transceiver system. In addition, it is also possible to change the communication method that is set to the CDMA base transceiver system.

Here, various kinds of means may be used as means for having an instruction made with respect thereto by the user or means for having an instruction made with respect thereto by an external device.

Also, in the present invention, there is not only a construction wherein only either one of the instruction input from the user or the instruction input from an external device, for example, is accepted. It is also possible to use a construction wherein an instruction that is input from each of them is accepted.

Also, the present invention provides a base transceiver system providing system for providing the above-described base transceiver system.

Specifically, in the base transceiver system providing system according to the present invention, base transceiver system information storage means stores information therein on a plurality of base transceiver systems in terms of whether each of these base transceiver systems is being utilized by a communication service provider or entity (throughout this specification, the communication service provider or entity is also referred to as "a communication service company" when the use of the wording "communication service company" is thought more suitable for clarification of the explanation). Here, each base transceiver system has program data set therein corresponding to the communication method that is selected from among a plurality of communication methods, and thereby has a function of performing wireless communication through the use of that communication method.

And, in case, for example, there is a communication service company wanting to utilize an empty base transceiver system (a base transceiver system that is not being utilized by a communication service company), according to the stored contents of the base transceiver system information storage means, search means makes search for (and presents) the empty base transceiver system to the communication service company. According to the request made by the communication service company wanting to utilize the base transceiver system searched for by the search means, register means changes, regarding that base transceiver system, the stored contents of the base transceiver system information storage means to those indicating that that base transceiver system is being utilized. Simultaneously, the program data setting means sets to that base transceiver system the program data corresponding to the communication method that the communication service company uses.

Namely, it has been arranged to manage whether the base transceiver system which is capable of coping with a plurality of communication systems is being utilized by the communication service company. According to the request made by the communication service company, a desired communication method (selected from among a plurality of settable communication methods) is set to the empty base transceiver system. Therefore, it is possible to smoothly offer a providing service of the base transceiver system and thereby to achieve an increase in the efficiency of the service.

Here, the number of a plurality of the base transceiver systems may be a wide variety of values.

Also, the base transceiver system is not necessarily limited to the CDMA base transceiver system. It is also possible to use the base transceiver system that adopts other types of communication methods (e.g. TDMA (Time Division Multiple Access) method or FDMA (Frequency Division Multiple Access) method or the like).

Also, the communication service provider is an entity that performs a communication service through the use of the base transceiver system by utilizing, for example, this base transceiver system. Concretely, the communication service provider is a communication service company, etc.

Also, the mode in which the base transceiver system is utilized by the communication service provider includes, for example, the mode in which in case the base transceiver system has been bought by the communication service provider it is regarded as being utilized, the mode in which in case the base transceiver system has been borrowed (rented) by the communication service provider it is regarded as being utilized, and the mode in which in case the base transceiver system has been reserved for utilization by the communication service provider it is regarded as being utilized.

Also, as the information on whether each base transceiver system is being utilized by the communication service company, it is possible to use, as an example, the information of a flag. Concretely, in case the flag of a relevant base transceiver system is in an "on" state, the flag indicates that that system is being utilized. On the other hand, in case the flag is in an "off" state, the flag can indicate that that system is out of use (i.e. empty). In this case, the state of the base transceiver system can be changed from the "out-of-use" state to the "in-use" state by changing the flag of the base transceiver system from the "off" state to "on" state.

Also, the base transceiver system information storage means can be constructed by using, for example, a memory or database having stored information therein. Also, the base transceiver system information storage means may store not only information (regarding whether a relevant base transceiver system is being utilized by the communication service company) therein but also other information.

Also, the construction for processing performed by the search means, the register means, and the program data setting means may be a type wherein that processing is executed, for example, according to an operation that is performed by the user on a side providing the base transceiver system or by the user on a communication service company side enjoying having provided thereto the base transceiver system. Also, as an example, it is in addition possible to make up a construction wherein there is provided a managing apparatus having the search means, register means, and program data setting means provided therein, whereby access is had to that managing apparatus from a terminal device provided at a remote place therefrom via, for example, the Internet lines, thereby requesting the execution of various kinds of pieces of processing.

Also, in the base transceiver system providing system according to the present invention, as a preferred embodiment, the base transceiver system information storage means further stores information therein regarding the installing place of the respective base transceiver systems as well as information regarding the cell areas of the respective base transceiver systems. Furthermore, the base transceiver system providing system is equipped with display means for making a display/output of information. Thereby, according to the stored contents of the base transceiver system information storage means, display control means displays the installing places, and their cell areas, of the base transceiver systems on a map by the display means.

Accordingly, the installing places, and their cell areas, of the respective base transceiver systems are displayed and are seen or visually grasped (for example, by the communication service company wanting to utilize). Therefore, it is possible to more smoothly perform the offer of the providing service of the base transceiver system.

Here, various kinds of means such as a display screen may be used as the display means.

Also, in the base transceiver system providing system according to the present invention, as a preferred embodiment, the program data storage means stores program data therein. The program data storage means is connected to the base transceiver system via the lines. On the other hand, the program data setting means acts on the operation that a change has been made by the register means (to the condition that the base transceiver system is being utilized). Accordingly, program data setting means transmits the program data stored in the program data storage means to the base transceiver system via the lines to thereby set that program data to the base transceiver system.

Accordingly, it is possible to cause a plurality of program data corresponding to various kinds of communication methods to be stored in the program data storage means provided, for example, at a remote place from the base transceiver system, and, thereby, when the necessity has arisen, to (automatically) transmit the program data corresponding to a desired communication method to the base transceiver system via the lines and set the program data therein. It is thereby possible to more smoothly perform the offer of the providing service of the base transceiver system.

Here, it is possible to use, for example, wired lines or wireless lines as the lines.

Also, the program data storage means can be constructed from, for example, a memory or database storing program data therein.

Incidentally, by making common use of the same memory or database, it is also possible to construct the program data storage means and base transceiver system information storage means.

DETAILED DESCRIPTION OF THE PREFERRED EMBODIMENTS

First Embodiment

A CDMA base transceiver system according to a first embodiment of the present invention will now be explained with reference to the drawings. It is to be noted that, in this first embodiment, an example of a method of setting program data according to the present invention will be explained collectively.

Figure 1:
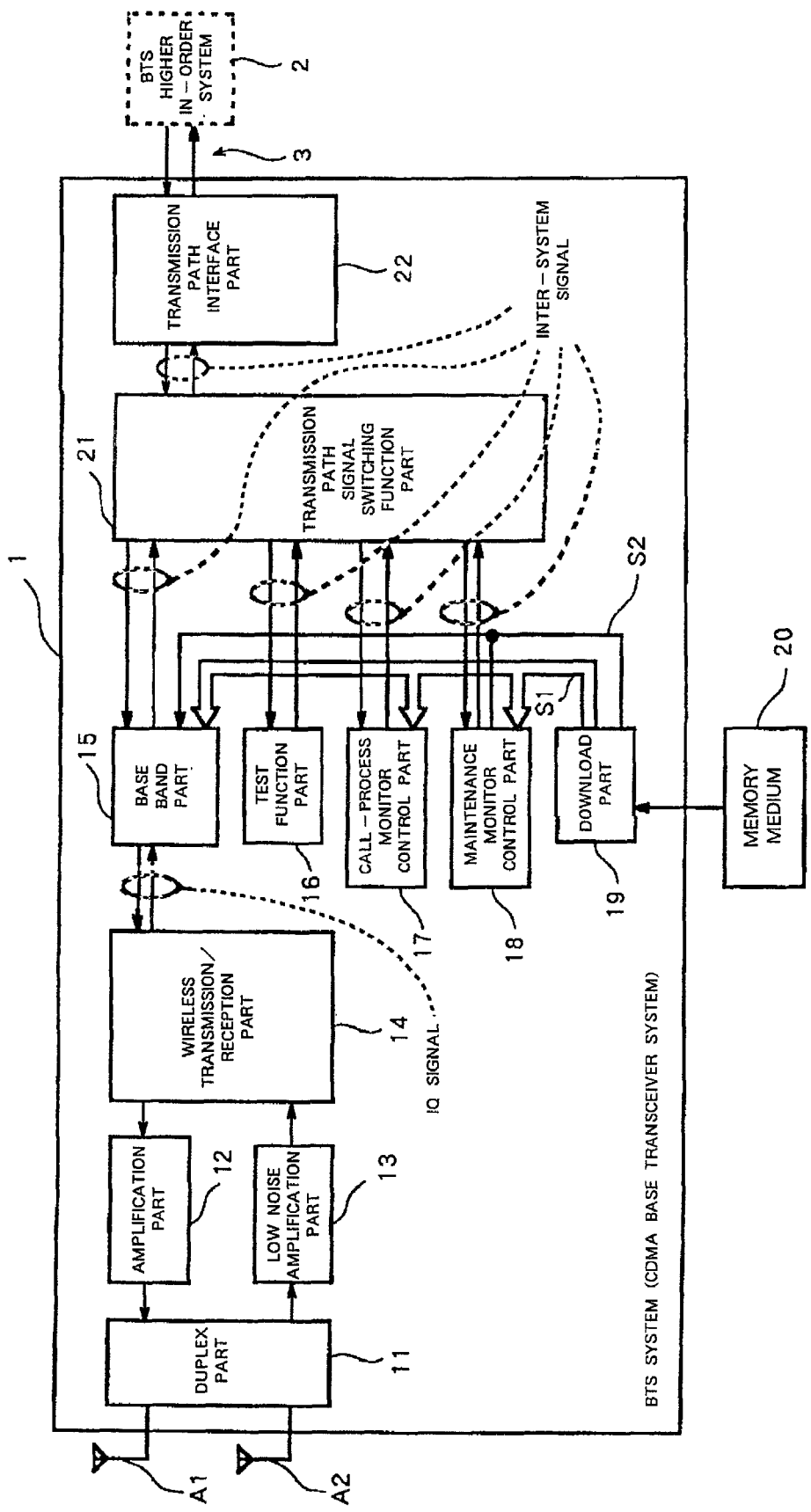
FIG. 1 is a view illustrating a construction example of a CDMA base transceiver system according to a first embodiment of the present invention.

A construction example of the CDMA base transceiver system (BTS system) of the first embodiment is illustrated in FIG. 1. The CDMA base transceiver system 1 is connected to a higher in-order system (a system whose order is higher than that of the BTS system) 2 via a bi-directional (e.g. ATM: Asynchronous Transfer Mode) wire transmission path 3.

Also, the CDMA base transceiver system 1 illustrated in FIG. 1 includes two antennas A1, A2, a duplex part 11, an amplifier part 12, a low-noise amplification part 13, a wireless transmission/reception part 14, a base band part 15, a test function part 16, a call-process monitor control part 17, a maintenance monitor control part 18, a download part 19, a transmission path signal switching function part 21, and a transmission path interface part 22 (e.g. the one having a signal processing function for processing an AAL-Type 2 and an AAL-Type 5 signal). The CDMA transceiver system 1 further includes a memory medium 20 that is freely removably attached to, for example, the download part 19.

Figure 7:
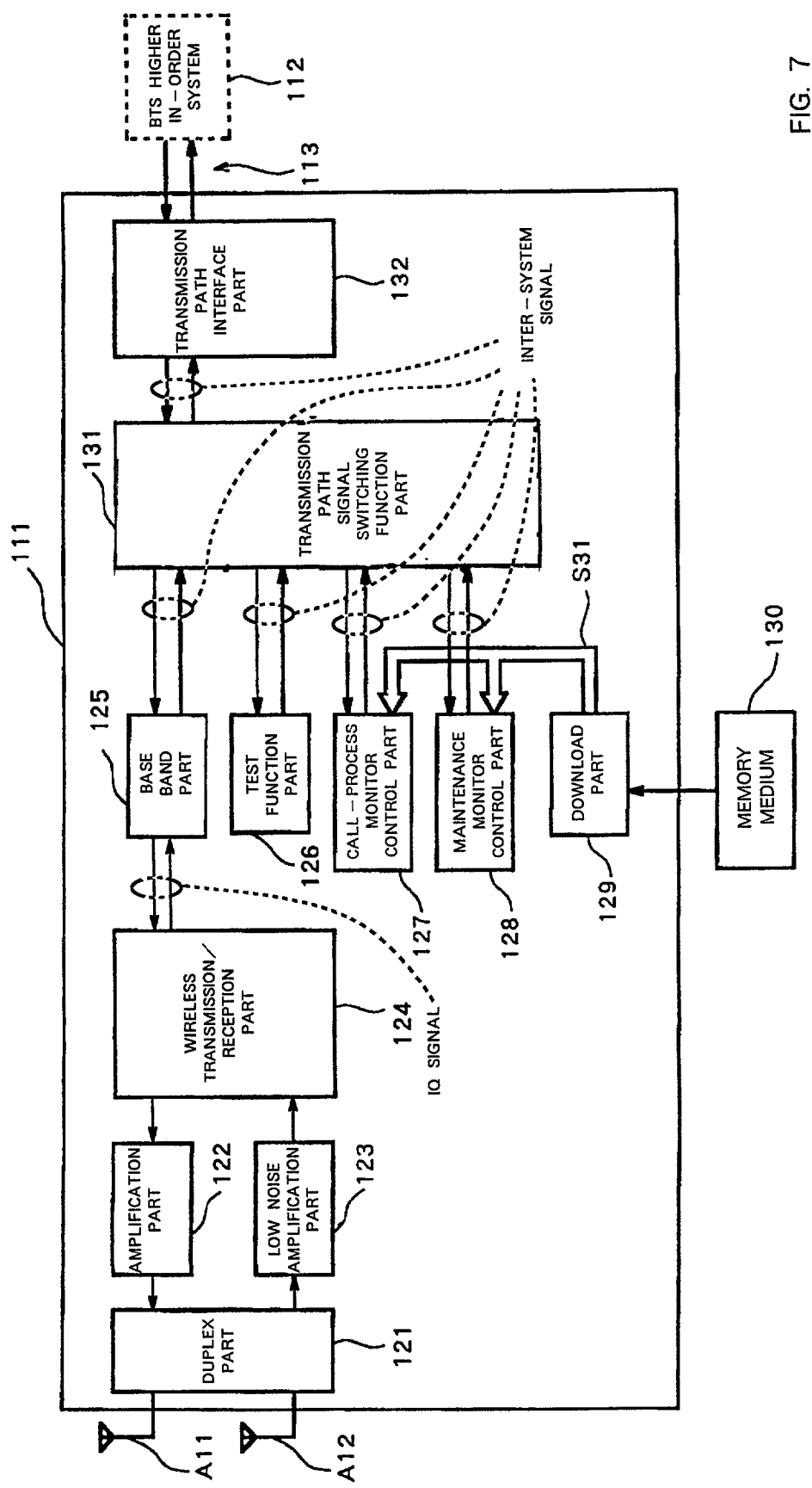
FIG. 7 is a view illustrating a construction example of a CDMA base transceiver system according to the prior art.

Here, the construction and operation of the CDMA base transceiver system 1 of the first embodiment illustrated in FIG. 1 have the portions that are the same as, and the portions that are different from, the construction and operation of the base transceiver system 111 illustrated in FIG. 7. In the following description, for brevity of the explanation, the portions of the CDMA base transceiver system 1 of the first embodiment that are different from the construction and operation of the base transceiver system 111 illustrated in FIG. 7 will be explained in detail.

Figure 4:
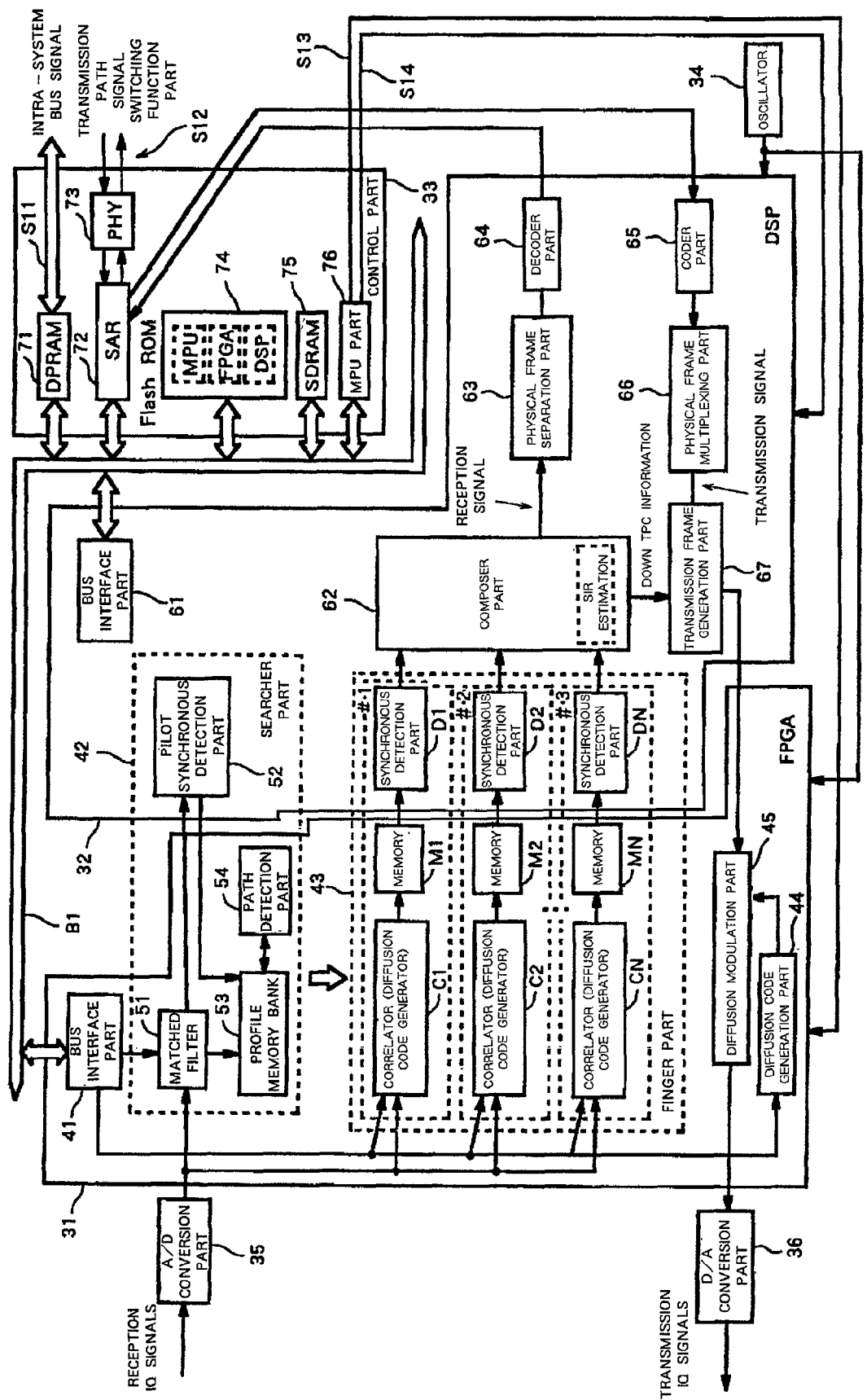
FIG. 4 is a view illustrating a construction example of a base band part.

Namely, in the first embodiment, as illustrated in FIG. 4, which will be described later, the construction and operation of the base band part 15 differ from those of the base band part 125 illustrated in FIG. 7.

Also, the maintenance monitor control part 18 of the first embodiment performs transmission/reception of a maintenance monitor control signal between itself and an outside operation system via the higher in order system 2. The maintenance monitor control part 18 thereby executes an operation management process of the BTS system and a state monitor control process of the BTS system. On the other hand, the maintenance monitor control part 18 executes a download of an application software (AP), a download of an FPGA configuration data, or a download of a DSP firmware through the control of a relevant software.

Also, the download part 19 of the first embodiment controls from the outside (e.g. by depression of the relevant switches) the following renewals: the renewal of the application software stored in a ROM equipped within the call-process monitor control part 17, the renewal of the application software stored in a ROM equipped within the maintenance monitor control part 18, or the renewal of the FPGA configuration data or DSP firmware stored in a ROM equipped within the base band part 15.

Also, the memory medium 20 of the first embodiment is constructed of a memory card, etc. removably attached to the download part 19. The memory medium 20 stores therein the application software for being stored in the ROM of the call-process monitor control part 17 and the ROM of the maintenance monitor control part 18, or the FPGA configuration data or DSP firmware for being stored in the ROM within the base band part 15.

Here, the application software, the FPGA configuration data, or the DSP firmware stored in the memory medium 20 is read out into the download part 19, and, via an intra-system bus signal S1, is transmitted (transferred) to the call-process monitor control part 17, the maintenance monitor control part 18, or the base band part 15 from the download part 19.

Also, in the download part 19, when transmitting the FPGA configuration data or the DSP firmware to the base band part 15, the download part 19 transmits a base band part download start signal S2 to the base band part 15.

Figure 2:
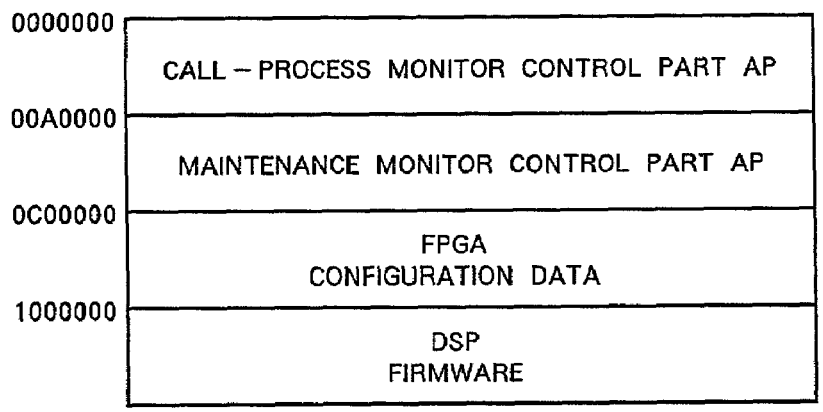
FIG. 2 is a view illustrating an example of a memory map of a memory medium.

Also, an example of a memory map of the memory medium 20 connected to the download part 19 is illustrated in FIG. 2.

As illustrated in FIG. 2, in the memory medium 20 of the first embodiment, respective pieces of application software (the call-process monitor control part AP, maintenance monitor control part AP), FPGA configuration data, and DSP firmware are stored, respectively, from prescribed head addresses. For this reason, a control part (a control part 97 as later described) of the download part 19 reads out requested data (the pieces of application software, FPGA configuration data, or DSP firmware) from their prescribed head addresses. The control part thereby outputs that requested data by way of the intra-system bus signal S1.

Figure 3:
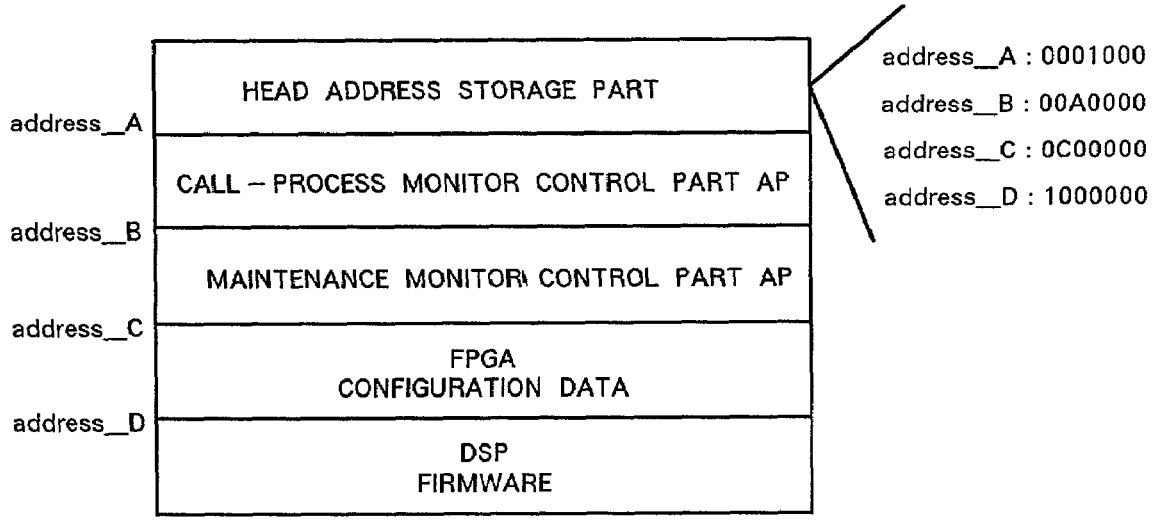
FIG. 3 is a view illustrating another example of the memory map of the memory medium.

Here, a case where the program size of each of the respective pieces of application software is fixed has been illustrated in the above-described FIG. 2. However, with the use of a memory map of the memory medium 20 such as that illustrated in FIG. 3, it is also possible to make the memory medium 20 cope with a case where the program size is variable. In the example illustrated in FIG. 3, at the head (it is to be noted that a header part for storing the head addresses of the respective programs does not necessarily need to be disposed at that head) of the memory medium 20, there is provided the header part (the head address storage part) for storing the head addresses of the respective programs. And when loading (reading out) a prescribed piece of program, it is loaded from the head address stored in that header part.

Next, a construction example of the above-described base band part 15 is illustrated in FIG. 4. This base band part 15 includes the following: an FPGA 31 that operates according to the FPGA configuration data, a DSP 32 that operates according to the DSP firmware, a control part 33, an oscillator 34, an A/D converter part 35, a D/A converter part 36, and a base band bus B1.

The FPGA 31 includes the following: a bus interface part 41, a searcher part 42, which includes a matched filter 51, a profile memory bank 53, and a path detection part 54, correlators C1 to CN and memories M1 to MN of a finger part 43, a diffusion-code generation part 44, and a diffusion modulation part 45.

The DSP 32 includes the following: a pilot synchronous detection part 52 of the searcher part 42, a bus interface part 61, synchronous detection parts D1 to DN of the finger part 43, a composer part 62, a physical frame separation part 63, a decoder part 64, a coder part 65, a physical frame multiplexing part 66, and a transmission frame generation part 67.

The control part 33 includes the following: a DPRAM 71, an SAR (Segmentation and Reassembly) 72, a physical device (PHY) 73, a flash (Flash) ROM 74, an SDRAM 75, and an MPU part 76.

In this way, in this first embodiment, there is made up, as the method of distributing the respective functions of the base band part 15 into the FPGA 31 and DSP 32, the following construction. Namely, the construction wherein signal processing executed at chip rates is allotted to the FPGA 31 and is thereby executed while signal processing at symbol rates and thereafter succeeding rates is allotted to the DSP 32 and is thereby executed. It is to be noted that the function of the searcher part 42 and that of the finger part 43 are each disposed so as to extend over and between the FPGA 31 and the DSP 32.

The reason why the construction has been made in this manner in the first embodiment is as follows. When attempting to perform signal processing at chip rates through, for example, the DSP, because chip-rate signals are much higher in speed than symbol-rate signals, the processor therefor necessitates the use of DSP which is capable of performing higher-speed signal processing.

Accordingly, distributing the respective functions of the first embodiment into the FPGA 31 and DSP 32 as illustrated in the above-described FIG. 4 provides a construction that is optimum in terms of the cost, etc.

An example of the operation of the base band part 15 will hereafter be explained.

Figure 8:
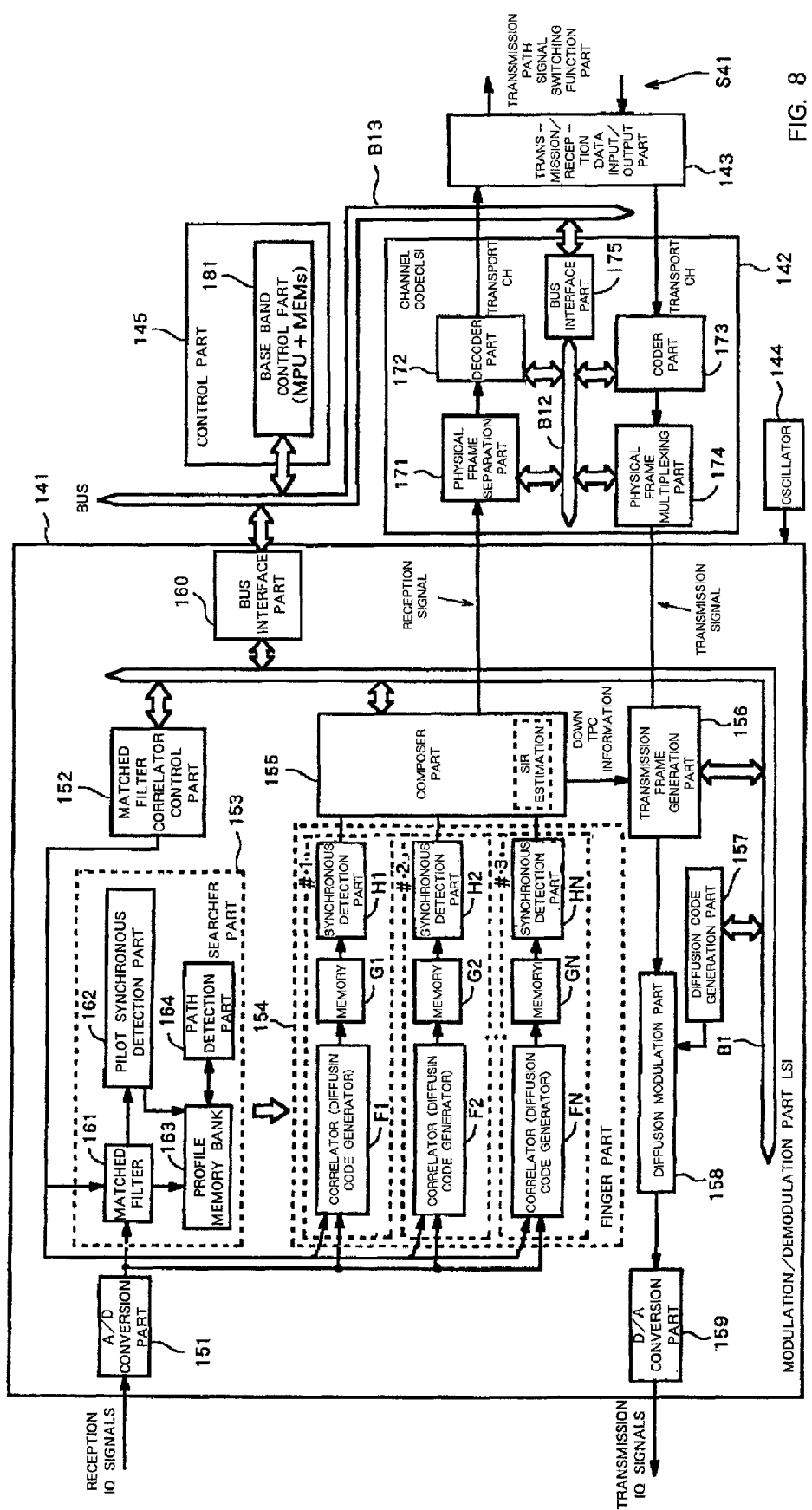
FIG. 8 is a view illustrating a construction of a base band part according to the prior art.

The A/D converter part 35 has a reception signal (an I signal and a Q signal) input thereto that is output from a wireless transmission/reception part 14 as an analog signal in the same way as in the case of, for example, the A/D converter part 151 illustrated in FIG. 8. The A/D converter part 35 then converts the reception signal to a digital signal and outputs the digital signal to the matched filter 51 of the searcher part 42 or to each of the correlators C1 to CN of the finger part 43.

The bus interface part 41 has an interface function between itself and the base band bus B1. The bus interface part 41 in the first embodiment serves as an interface for controlling, from the control part 33, a diffusion code that is used in the matched filter 51 of the searcher 42, a diffusion code that is used in each of the correlators C1 to CN of the finger part 43, or a diffusion code generated from the diffusion code that is generation part 44.

As in the case of, for example, the searcher part 153 illustrated in FIG. 8, the searcher part 42 includes the matched filter 51, the pilot synchronous detection part 52, the profile memory bank 53, and the path detection part 54. The searcher part 42 detects the path of the reception signal that is input from the A/D converter part 35 and notifies the detected result to the finger part 43.

As in the case of, for example, the finger part 154 illustrated in FIG. 8, the finger part 43 includes a plurality of (e.g. an N number of pieces) signal processing systems #1 to #N each constructed of one correlator C1 to CN equipped with a diffusion code generator, one piece of memory M1 to MN, and one piece of synchronous detection part D1 to DN.

According to the detected path result that is notified from the searcher part 42, the finger part 43 demodulates the reception signal for each path with the use of each relevant signal processing system #1 to #N. The finger part 43 outputs the demodulated result to the composer part 62.

The bus interface part 61 has an interface function between a device and the base band bus B1 and, in the first embodiment, the bus interface part 61 connects the DSP 32 and the base band bus B1.

As in the case of, for example, the composer part 155 illustrated in FIG. 8, the composer part 62 composes the synchronous-detected results corresponding to a plurality of paths that are input from the finger part 43 with the use of, for example, "a maximum-ratio composing method". The composer part 62 outputs the composed result to the physical frame separation part 63 as a final reception signal. Further, the composer part 62 detects a signal power/interference power ratio (SIR) with regard to the composed result. According to the detected result, the composer part 62 generates a transmission power control (TPC) bit for controlling the transmission power and outputs the transmission power control bit to the transmission frame generation part 67.

As in the case of, for example, the physical frame separation part 171 illustrated in FIG. 8, the physical frame separation part 63 separates a physical channel from the reception signal (the composed result) input from the composer part 62. Then, the physical frame separation part 63 outputs the post-separation reception signal to the decoder part 64.

As in the case of, for example, the decoder part 172 illustrated in FIG. 8, the decoder part 64 performs deinterleave processing or error correction decoding with respect to the reception signal input from the physical separation part 63. Then, the decoder part 64 outputs the reception signal after those pieces of processing to the SAR 72 of the control part 33.

As in the case of, for example, the coder part 173 illustrated in FIG. 8, the coder part 65 performs de-interleave processing or error correction coding with respect to the transmission signal input from the SAR 72 of the control part 33. Then, the coder part 65 outputs the transmission signal after those pieces of processing to the physical frame multiplexing part 66.

As in the case of, for example, the physical frame multiplexing part 174 illustrated in FIG. 8, the physical frame multiplexing part 66 performs mapping into physical channels of the transmission signal input from the coding part 65. Then, the physical frame multiplexing part 66 outputs the post-mapping transmission signal to the transmission frame generation part 67.

As in the case of, for example, the transmission frame generation part 156 illustrated in FIG. 8, the transmission frame generation part 67 generates transmission frames by the use of the transmission signal input from the physical frame multiplexing part 66. Then, the transmission frame generation part 67 outputs the thus-generated transmission frame to the diffusion modulation part 45. Further, the transmission frame generation part 67 controls the transmission power according to the transmission power control bit input from the composer part 62.

As in the case of, for example, the diffusion code generation part 157 illustrated in FIG. 8, the diffusion code generation part 44 generates a diffusion code according to the instruction from the control part 33. The diffusion code generation part 44 then outputs the thus-generated diffusion code to the diffusion modulation part 45. It is to be noted that there can also be a construction wherein the code generated in the diffusion code that is generation part 44 is supplied as an inverse diffusion code to the searcher part 42 or to the finger part 43.

As in the case of, for example, the diffusion modulation part 158 illustrated in FIG. 8, the diffusion modulation part 45 performs diffusion modulation of the transmission frame signal (framed transmission signal) input from the transmission frame generation part 67 by the use of the diffusion code that is input from the diffusion code generation part 44. The diffusion modulation part 45 then outputs the diffusion-modulated transmission frame signal to the D/A converter part 36.

As in the case of, for example, the D/A converter part 159 illustrated in FIG. 8, the D/A converter 36 converts the diffusion-modulated) transmission frame, which is input as a digital signal from the diffusion modulation part 45, to an analog signal. The D/A converter 36 then outputs the post-conversion signal to the wireless transmission/reception part 14 as a transmission signal (I signal and Q signal).

The DPRAM 71 performs an interface between the base band bus B1 and the intra-system bus signal S11.

The SAR 72 is an SAR device that is, for example, in asynchronous transfer mode (ATM). The SAR 72 outputs a (reception) signal input from the decoder part 64 of the DSP 32 to the physical device 73, while the SAR 72 outputs a (transmission) signal input from the physical device 73 to the coder part 65 of the DSP 32.

The physical device 73 is a physical device that is, for example, in ATM. The physical device 73 outputs a reception signal input from the SAR 72 to the transmission path signal switching function part 21 as an ATM signal S12, while the physical device 73 outputs an ATM signal S12 input from the transmission path signal switching function part 21 to the SAR 72 as a transmission signal.

Incidentally, in this first embodiment, a construction has been described wherein the signal (transport channel data) output from the decoder part 64 of the DSP 32 or the signal (transport channel data) input from the coder part 65 is transmitted in ATM. However, no particular limitation is imposed upon the method of transmitting an intra-system signal between the parts of the BTS system. It is also possible to use a method of transmitting the signal with the use of, for example, an Ethernet line, VME bus, or PCI bus.

The flash memory ROM 74 is a loadable ROM. The flash memory 74 stores program data (MPU program) therein for operating the MPU of the MPU part 76, FPGA configuration data for operating the FPGA 31, or DSP firmware for operating the DSP 32.

The SDRAM 75 is a memory for temporarily storing data, for example, and, in the first embodiment, the SDRAM 75 is used as a working area for the MPU part 76.

The MPU part 76 has an MPU. By executing an MPU program, the MPU part 76 performs various kinds of pieces of processing or control in the base band part 15. Incidentally, in FIG. 4, there is illustrated a configuration data transfer control signal S13 that is transmitted from the MPU part 76 to the FPGA 31 or a firmware download control signal S14 that is transmitted from the MPU part 76 to the DSP 32.

The base band bus B1 is connected to the FPGA 31, the DSP 32, or the DPRAM 71, the SAR 72, the flash ROM 74, the SDRAM 75 and the MPU part 76.

The oscillator 34 not only supplies a clock signal for operating the FPGA 31 to the FPGA 31 but also supplies a clock signal for operating the DSP 32 to the DSP 32.

Here, in the first embodiment, a construction is provided wherein it is possible to set the FPGA configuration data and DSP firmware to the FPGA 31 and DSP 32 by performing switching between each of the following three pairs of data: (1) the FPGA configuration data and the DSP firmware for causing the execution of the wireless communication processing based on the use of the W-CDMA/TDD method by the FPGA 31 and DSP32; (2) the FPGA configuration data and the DSP firmware for causing the execution of the wireless communication processing based on the use of the W-CDMA/FDD method by the FPGA 31 and DSP32; and (3) the FPGA configuration data and DSP firmware for causing the execution of the wireless communication processing based on the use of the multi-carrier CDMA method by the FPGA 31 and DSP32.

In this case, in general, in each of the W-CDMA/TDD method and W-CDMA/FDD method, a chip-rate frequency of 3.84 MHz is used, while a chip-rate frequency of 1.2288 MHz and 3.6864 MHz is used in the multi-carrier CDMA method. Therefore, the chip-rate frequency differs between the W-CDMA method and the multi-carrier CDMA method.

On that account, the oscillator 34 of the first embodiment is constructed, as a preferred embodiment, by using the following oscillator. The oscillator that oscillates a clock signal whose frequency has the value of a common multiple of the chip rate frequency for the W-CDMA method and the chip rate frequency for the multi-carrier CDMA method. The clock signal that is caused to oscillate from that one oscillator is supplied to the FPGA 31 or to the DSP 32. The FPGA 31 operates by a clock signal whose frequency is a chip-rate frequency (for W-CDMA method or multi-carrier CDMA method) being generated by using a clock signal input from the oscillator 34. On the other hand, the DSP 32 operates by a clock signal whose frequency is a symbol-rate frequency (for W-CDMA method or multi-carrier CDMA method) being generated by using a clock signal input from the oscillator 34.

Namely, the frequency that has the value of the above-described common multiple becomes an integral multiple of a W-CDMA method of chip-rate and symbol-rate frequency or a multi-carrier CDMA method of chip-rate frequency and symbol-rate frequency. Therefore, in the FPGA 31 or the DSP 32, the speed of a clock signal whose frequency has the value of the above-described common multiple is made to be (1/an integer) time as high, which enables a clock signal to be generated which has a required value of frequency.

Also, in the first embodiment, the FPGA 31 or DSP 32 has a construction of producing a required-frequency clock signal by the use of a clock signal whose frequency has the value of the common multiple. Therefore, the contents of the FPGA configuration data or DSP firmware that regards, for example, the diffusion code generation part 44 for generating diffusion codes or a frequency-divider circuit for executing the above-described (1/an integer) time as high processing differ between the W-CDMA method and the multi-carrier CDMA method.

It is to be noted that, as the frequency that has the value of the common multiple, as one example, it is possible to use a frequency of 92.16 MHz (=3.84 MHz.times.24=1.2288 MHz.times.75=3.6864 MHz.times.25).

Figure 5:
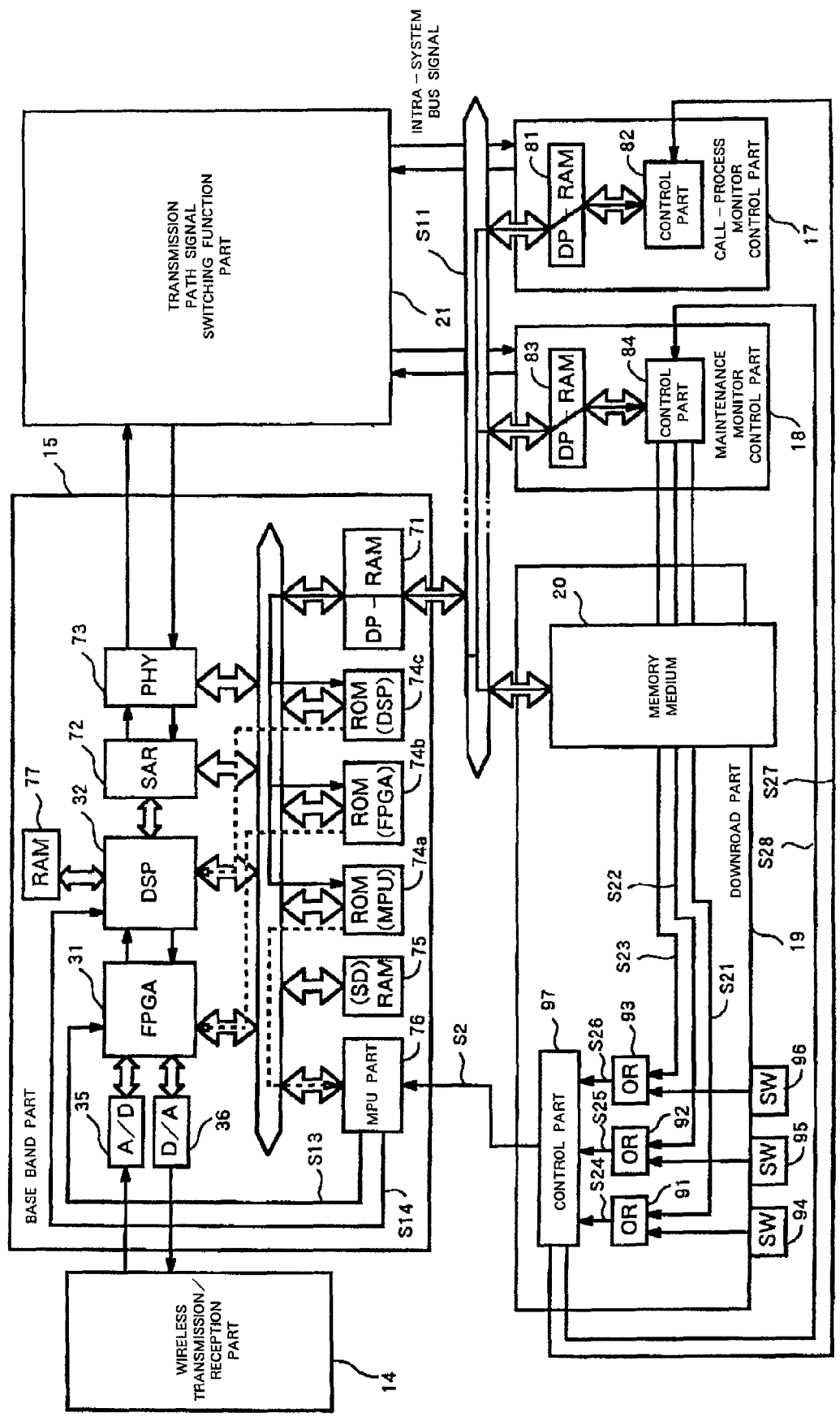
FIG. 5 is a view illustrating a construction example of a construction portion regarding a download function.

Next, in FIG. 5, construction examples of the construction parts of the CDMA base transceiver system of the first embodiment are illustrated that regard the download function for the application software of the call-process monitor control part 17, and the application software, the FPGA configuration data, and the DSP firmware of the maintenance monitor control part 18.

Specifically, in the wireless transmission/reception part 14, the base band part 15, the call-process monitor control part 17, the maintenance monitor control part 18, the download part 19, the memory medium 20, and the transmission path signal switching function part 21 are illustrated in FIG. 5.

Also, construction examples of the FPGA 31, the DSP 32, the A/D converter part 35, the D/A converter part 36, the DPRAM 71, the SAR 72, the physical device 73, the flash memories ROM's 74$a$ to 74$c$, the SDRAM 75, the MPU part 76, and the RAM 77 within the base band part 15 are illustrated in FIG. 5. Incidentally, in FIG. 5, the ROM 74$a$ for storing an MPU program therein, the ROM 74$b$ for storing the FPGA configuration data therein, and the ROM 74$c$ for storing the DSP firmware therein are illustrated as separate ROMs.

Also, a DPRAM 81 serving as an interface for the intra-system bus signal S11 and a control part 82 for performing various kinds of control are illustrated in FIG. 5 as construction examples within the call-process monitor control part 17. A DPRAM 82 serving as an interface for the intra-system bus signal S11 and a control part 84 for performing various kinds of control are illustrated in FIG. 5 as construction examples within the maintenance monitor control part 18.

Also, three OR circuits 91, 92, and 93, which are connected to the control part 84 of the maintenance monitor control part 18, and a control part 97 for controlling the downloading operation are illustrated in FIG. 5 as construction examples within the download part 19. Also, three switches (SW) 94, 95, and 96 which are able to be operated by the user are equipped in the download part 19 of the first embodiment. Also, in the first embodiment, the memory medium 20 is inserted into the download part 19, whereby it becomes possible to transmit the intra-system bus signal S11 between each of the base band part 15, the call-process monitor control part 17, and the maintenance monitor control part 18.

One example of the download-processing operation that is executed through the operations of the construction parts illustrated in FIG. 5 will hereafter be explained.

First, an operation example of the download processing that is executed of the application software of the call-process monitor control part 17 is explained.

The start of this download processing is caused according to the depression of, for example, the switch 94 or the request (e.g. software control) that is made from a higher in-order system 2.

Specifically, in case, for example, the switch 94 is depressed, there is output from the OR circuit 91 a call-process monitor control part AP download start signal S24, which is input to the control part 97. Thereby, the start of the download processing is caused.

Also, in case, for example, a request has been made from the higher in-order system 2, a call-process monitor control part AP download start request signal S21 is output from the control part 84 of the maintenance monitor control part 18 to the OR circuit 91. Corresponding to this, there is output from the OR circuit 91 a call-process monitor control part AP download start signal S24, which is input to the control part 97. Thereby, the start of the download processing is caused.

The following is to be noted. Regarding the OR circuit 91, in case either one or each of the signal indicating the depression of the switch 94 and the call-process monitor control part AP download start request signal S21 is input thereto, the OR circuit 91 outputs the call-process monitor control part AP download start signal S24 to the control part 97.

Subsequently, the control part 97 that has received the call-process monitor control part AP download start signal S24 outputs a call-process monitor control part AP download start signal S27 to the control part 82 of the call-process monitor control part 17. Simultaneously, the control part 97 transmits (transfers) the application software for call-process monitor control, which is stored in the memory medium 20, to the control part 82 through the use of the intra-system bus signal S11 via the DPRAM 81 within the call-process monitor control part 17.

Through the execution of the above-described download processing, the application software stored in the memory medium 20 is set in the call-process monitor control part 17. Thereby, in the call-process monitor control part 17, it becomes possible to execute the processing according to the contents of the thus-set application software.

Next, an operation example of the processing of downloading the application software of the maintenance monitor control part 18 is explained.

The start of this download processing is caused according to the depression of the switch 95, for example, or, the request (e.g. software control) made from a higher in-order system 2.

Specifically, in case, for example, the switch 95 has been depressed, there is output from the OR circuit 92 the maintenance monitor control part AP download start signal S25, which is input to the control part 97. Thereby, the start of the download processing is caused.

Also, in case, for example, a request has been made from a higher in-order system 2, the maintenance monitor control part AP download start request signal S22 is output from the control part 84 of the maintenance monitor control part 18 to the OR circuit 92. According thereto, the maintenance monitor control part AP download start signal S25 is output from the OR circuit 92, and is input to the control part 97. Thereby, the start of the download processing is caused.

The following is to be noted. Regarding the OR circuit 92, in case either one or each of the signal indicating the depression of the switch 95 and the maintenance monitor control part AP download start request signal S22 is input thereto, the OR circuit 92 outputs the maintenance monitor control part AP download start signal S25 to the control part 97.

Subsequently, the control part 97 that has received the maintenance monitor control part AP download start signal S25 outputs a maintenance monitor control part AP download start signal S28 to the control part 84 of the maintenance monitor control part 18. Simultaneously, the control part 97 transmits (transfers) the application software for maintenance monitor control, which is stored in the memory medium 20, to the control part 84 through the use of the intra-system bus signal S11 via the DPRAM 83 within the maintenance monitor control part 18.

Through the execution of the above-described download processing, the application software stored in the memory medium 20 is set in the maintenance monitor control part 18. Thereby, in the maintenance monitor control part 18, it becomes possible to execute the processing according to the contents of the thus-set application software.

Next, an operation example of the download processing operation for downloading the FPGA configuration data of the FPGA 31 or the DSP firmware of the DSP 32 to the base band part 15 will be explained.

The start of this download processing is caused according to, for example, the depression of the switch 96, or the request (e.g. software control) made from a higher in-order system 2.

Specifically, in case, for example, the switch 96 has been depressed, there is output from the OR circuit 93 a base band part download start signal S26, which is input to the control part 97. Thereby, the start of the download processing is caused.

Also, in case, for example, a request has been made from a higher in-order system 2, a base band part download start request signal S23 is output from the control part 84 of the maintenance monitor control part 18 to the OR circuit 93. According thereto, there is output from the OR circuit 93 the base band part download start signal S26, which is input to the control part 97. Thereby, the start of the download processing is caused.

The following is to be noted. Regarding the OR circuit 93, in case either one or each of the signal indicating the depression of the switch 96 and the base band part download start request signal S23 is input thereto, the OR circuit 93 outputs the base band part download start signal S26 to the control part 97.

Subsequently, the control part 97 that has received the base band part download start signal S26 outputs a base band part download start signal S2 to the MPU part 76 of the base band part 15. Simultaneously, the control part 97 transmits (transfers) the FPGA configuration data stored in the memory medium 20 to the (for-use-for-FPGA) ROM 74*b* through the use of the intra-system bus signal S11 via the DPRAM 71 within the base band part 15. Further, the control part 97 transmits (transfers) the DSP firmware stored in the memory medium 20 to the (for-use-for-DSP) ROM 74*c* through the use of the intra-system bus signal S11 via the DPRAM 71 within the base band part 15.

Subsequently, the MPU part 76 that has received the base band part download start signal S2 operates as follows after completing the above-described transmission (transfer) of the FPGA configuration data to the (for-use-for-FPGA) ROM 74 or the above-described transmission (transfer) of the DSP firmware to the (for-use-for-DSP) ROM 74*c*. Namely, the MPU part 76 outputs a configuration data transfer control signal S13 to the FPGA 31 to thereby execute configuration of the FPGA 31. Simultaneously, the MPU part 76 outputs a firmware download control signal S14 to the DSP 32 to thereby execute download of the DSP firmware to the DSP 32.

Through the execution of the above-described download processing, the FPGA configuration data stored in the memory medium 20 is set to the FPGA 31 while the DSP firmware stored in the memory medium 20 is set to the DSP 32. As a result of this, in the FPGA 31, it becomes possible to execute processing according to the contents of the thus-set FPGA configuration data. On the other hand, in the DSP 32, it becomes possible to execute processing according to the contents of the thus-set DSP firmware.

In the first embodiment, through the execution of the above-described download processing, for example, the FPGA configuration data and the DSP firmware corresponding to the TDD method of the W-CDMA, the FPGA configuration data and the DSP firmware corresponding to the FDD method of the W-CDMA, or the FPGA configuration data and the DSP firmware corresponding to the multi-carrier CDMA method can have its initial setting done to the FPGA 31 or DSP 32. Alternatively, in case the FPGA configuration data or the DSP firmware corresponding to any one of the communication methods is kept so as to be set to, for example, the FPGA 31 or DSP 32, re-setting of the FPGA configuration data or the DSP firmware corresponding to a different communication method can be done to the FPGA 31 or DSP 32.

Incidentally, in the first embodiment has been constructed in such a form wherein download processing is executed according to the depression of the switches 91 to 93 or the request made from a higher in-order system 2. However, the first embodiment may also be constructed in such a form wherein due, for example, to the clue that the power source of the download part 19 has been switched to "on", the data (application software or FPGA configuration data or DSP firmware) stored in the memory medium 20 is automatically read out and loaded down. Further, it is also possible to use a construction of a remote download wherein a download is executed through the performance of a control made from, for example, a remote system connected to the download part 19 via relevant lines.

As described above, in the CDMA base transceiver system 1 of the first embodiment, the following construction of the base band part 15 has been adopted. Namely, the construction parts for performing processing at a chip rate are incorporated into an FPGA package while the construction parts for performing processing at a symbol rate are incorporated into a DSP package. Thereby, downloading the software for each package is made possible. Further, the first embodiment has been constructed to keep the software for each package stored into a memory card, etc. beforehand, and to connect the memory card, etc. to (the download part 19 of) the CDMA base transceiver system 1 to thereby enable downloading the software to the base band part 15.

In this way, in the CDMA base transceiver system 1 of the first embodiment, it is based on the construction of the base band part 15 that uses the FPGA 31 and the DSP 32. With this construction, it is possible to make the efficiency of the signal processing high. Simultaneously, the pieces of software (FPGA configuration data and DSP firmware) corresponding, for example, to various types of communication methods can be set. In addition, by this setting, it is possible to execute signal processing corresponding to each of various types of communication methods through the use of the FPGA 31 or DSP 32. Namely, in the CDMA base transceiver system 1 of the first embodiment, even if performing no changes of, for example, hardware, it is possible to correspond to a plurality of communication methods by changing the software for FPGA 31 or DSP 32.

Specifically, in, for example, the conventional CDMA base transceiver system, regarding the software, changes thereof were certainly possible with use of the download part. However, in order to make such software correspond to the specification of a different air interface, correction of the hardware was necessary. For this reason, exchanges of the hardware (substrate) were necessary. In contrast to this, in the CDMA base transceiver system 1 of the first embodiment, the hardware of the base band part 15 that concerns the specification of the air interface is constructed of the FPGA 31 and the DSP 32. Therefore, it is possible to realize causing correspondence to the specification of a different air interface through a common use of the same hardware (substrate).

Also, in the first embodiment, as described above, the configuration data (circuit construction) of the FPGA 31 and the firmware of the DSP 32 are stored in the memory medium 20 of the download part 19 jointly with the application software (of the call-process monitor control part 17 and maintenance monitor control part 18). Therefore, by inserting the memory medium 20 consisting of a memory card, etc. into the download part 19 of) the CDMA base transceiver system 1, it is possible to easily change the circuit construction of the FPGA 31 within the base band part 15 or the firmware of the DSP 32.

Accordingly, without making any changes of the hardware, for example, as described above, it is possible to cause correspondence to the specification of each of the respective standardized air interfaces. Namely, it becomes possible to provide a made-common hardware that is independent of the specification of the air interface. Therefore, it is possible to enhance the efficiency of, for example, the CDMA base transceiver system from its development to its manufacture. As a result of this, it is possible to provide, for example, an inexpensive CDMA base transceiver system. In addition, it becomes possible to make flexible correspondence with respect to the changes in the specification of the air interface and also to make correspondence to a plurality of communication methods only by changing the software. Therefore, the present invention is very advantageous in terms of the cost.

Incidentally, the W-CDMA/TDD method, the W-CDMA/FDD method, or the multi-carrier CDMA method are communication methods that are similar to one another. Changing the construction parts (the construction parts for performing processing after the base band processing) to enable replacement of the software without needing to change the hardware makes it possible to cause correspondence to each of those three kinds of communication methods. In the first embodiment, replacing the software for the FPGA 31 and DSP 32 enables correspondence to each of those three kinds of communication methods.

Also, as the (wireless) base transceiver system, there are three types: for example, an ultra-small capacity type, an intermediate capacity type, and a large capacity type. The construction of the base band part 15 such as the one in the first embodiment is particularly effective when applied to an ultra-small capacity type of (wireless) base transceiver system. Incidentally, when the scale of the respective capacities is converted in terms of the channel (voice channel), the ultra-small capacity type corresponds to a 40 or so channel system, the intermediate capacity type corresponds to a 256 or so channel system, and the large capacity type corresponds to a 768 or so channel system.

Also, the CDMA base transceiver system 1 of the first embodiment, as a preferred embodiment, has been constructed in such a form as to oscillate with the oscillator 34 a clock signal whose frequency has a value of the common multiple of the chip-rate frequency for W-CDMA method and the chip-rate frequency for multi-carrier CDMA method. However, ordinarily, it is also possible that the frequency of the system clock and the chip-rate frequency greatly differ from each other. Therefore, in such a case, it is also preferable that first oscillation means for oscillating a signal having a frequency corresponding to each of a plurality of kinds of chip-rate frequencies (a plurality of kinds of diffusion code frequencies) used in a different type of communication method and second oscillation means for oscillating a signal having a frequency corresponding to each of a plurality of kinds of symbol rate frequencies used in that different type of communication method be equipped to the oscillator 34.

Here, in the first embodiment, the FPGA configuration data corresponds to an example of the FPGA program data referred to in the present invention while the DSP firmware corresponds to an example of the DSP program data referred to in the present invention.

Also, in the first embodiment, there is the function that the download part 19, etc. reads in the FPGA configuration data or the DSP firmware stored in the memory medium 20 and sets it to the FPGA 31 or DSP 32 within the base band part 15, or the function of changing the program data through the performance of such setting. This function constitutes program data setting means or program data changing means referred to in the present invention.

Also, in the first embodiment, there is the function of causing the download part 19 to be connected to the memory medium 20, which function constitutes memory connection means referred to in the present invention.

Also, in the first embodiment, there is the function of the oscillator 34 or the like supplying a clock signal having a frequency corresponding to each of the chip rates of a plurality of communication methods or a clock signal having a frequency corresponding to each of the symbol rates of a plurality of communication methods. This function constitutes clock means referred to in the present invention.

Second Embodiment

Next, a base transceiver system according to a second embodiment of the present invention will be explained with reference to FIG. 6.

Figure 6:
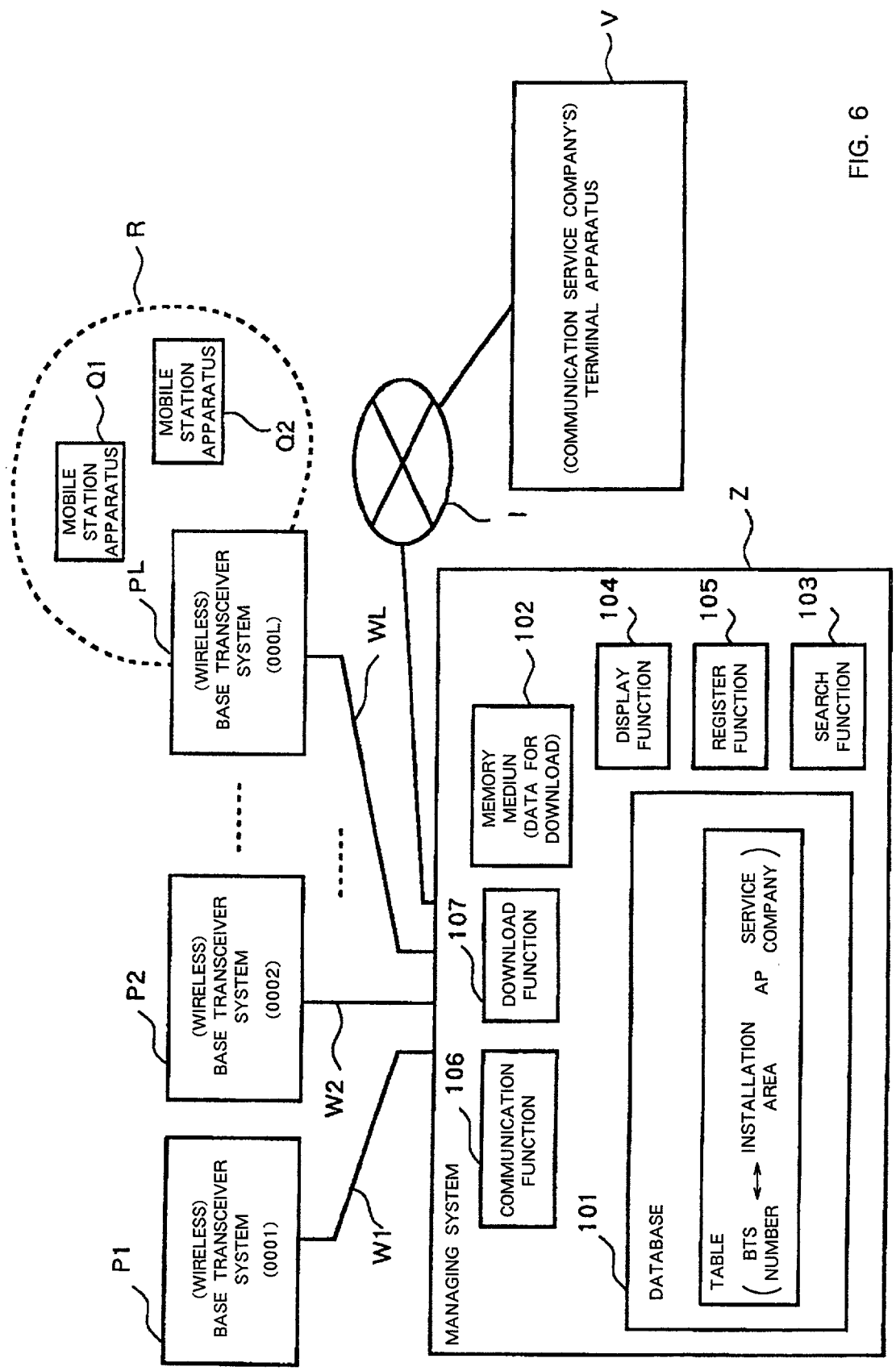
FIG. 6 is a view illustrating an example of a base transceiver system providing system according to a second embodiment of the present invention.

An example of the base transceiver system providing system of the present invention is illustrated in FIG. 6. This base transceiver system providing system is constructed of a managing system Z. This managing system Z is connected to, for example, a plurality (e.g. an L number) of (wireless) base transceiver systems P1 to PL through the intermediary of wire lines W1 to WL. The managing system z is also connected to a (communication service company's) terminal apparatus V through the intermediary of Internet lines I.

Here, in the second embodiment, as each of the respective base transceiver systems P1 to PL, there is a CDMA base transceiver system (in this embodiment an ultra-small capacity type) that is the same as that illustrated, for example, in the first embodiment. Namely, the respective base transceiver systems P1 to PL each have set thereto program data (in this embodiment, the FPGA configuration data or the DSP firmware) corresponding to a desired communication method. Each of the base transceiver systems P1 to PL thereby has a construction of enabling wireless communication through the use of that communication method. In addition, through reloading such program data, each base transceiver system P1 to PL can be made to correspond to a relevant one of a plurality of communication methods.

For convenience of explanation, the illustration of FIG. 6 is described as follows. With one base transceiver system PL being representatively used, an example of a cell area (communicatable area) R of the base transceiver system PL is illustrated. Further, a plurality of mobile-station apparatuses Q1, Q2 existing within the cell area R are illustrated.

Also, each of the respective base transceiver systems P1 to PL has its peculiar identification information (in the second embodiment, the number information "0001" to "000L") allocated thereto.

Also, although only one (communication service company's) terminal apparatus V has been illustrated in FIG. 6, the second embodiment provides for a case where the base transceiver systems P1 to PL are respectively provided with a plurality of communication service companies (if desired).

Also, the managing apparatus Z includes the following construction parts: a database 101 for storing data therein, a memory medium 102 for storing program data therein for use for download (in this embodiment, FPGA configuration data or DSP firmware), a search function 103 for searching the database 101, a display function 104 for making display/output of information by being equipped with, for example, a display screen, a register function 105 for registering (in this embodiment including a change) data with respect to the database 101, a communication function 106 having a function of communicating information between itself and each of the base transceiver system P1 to PL via a relevant wire line W1 to WL or a function of communicating information between itself and the terminal apparatus V via the Internet line I, and a download function 107 for transmitting program data stored in the memory medium 102 to each of the base transceiver system P1 to PL.

Illustrated below is a case where a person who provides the base transceiver systems P1 to PL (the base transceiver system providing person) provides the managing system Z and, by using this managing system Z, provides the base transceiver systems P1 to PL with respect to the communication service company.

Namely, the base transceiver system providing person first installs each of the base transceiver systems P1 to PL on a BTS equipping point (e.g. on a telephone pole or telephone booth or the like) in a given area of the communication zone. It is to be noted that there is no particular limitation as to the installing place for each of the base transceiver systems P1 to PL. However, it is effective to keep it installed at a place such as the interior of a tunnel or an underground shopping center, where the electric waves are unlikely to reach.

Also, as described above, a peculiar number is allotted to each of the respective base transceiver systems P1 to PL. Thereby, the base transceiver system providing person keeps table data stored in the database 101 as the number information of the base transceiver systems P1 to PL and place data (the data on the equipping points) of the places where the base transceiver systems P1 to PL have been installed in such a way so that the information and the place data correspond to each other.

Also, in the second embodiment, the following data is also stored in the database 101 as part of the table data. The data for specifying the cell areas of the respective base transceiver systems P1 to PL. The data for specifying program data (in this embodiment, the application software such as FPGA configuration data or DSP firmware. Namely, according to the type of the application software, a communication method can be identified) that is now set (loaded) on the respective base transceiver systems P1 to PL. And, the data for specifying which communication service company each of the base transceiver systems P1 to PL is now being provided (in this embodiment, bought by or rented) to.

Incidentally, regarding the base transceiver systems P1 to PL to which none of the program data is set, information indicating that the relevant portion is "empty" (e.g. a flag indicating that the relevant portion is empty) is kept stored beforehand in that relevant portion of the table data. Similarly, regarding the base transceiver systems P1 to PL that are not being provided to any communication service company, there is stored information indicating that that relevant portion is "empty" is stored in the relevant portion of the table data.

Further, the base transceiver system providing person accepts a request to provide the base transceiver system P1 to PL from each of (a plurality of) communication service companies.

In this case, the managing system Z makes a search for the database 101 through the use of the search function 103. The managing system Z can thereby find an ("empty") base transceiver system, provided to none of the communication service companies, as a providing candidate. The managing system can thereby make a display/output of the searched result through the use of the display function 104.

Also, in case, for example, the display function 104 of the second embodiment makes a display/output of the above-described searched result, the display function 104 can also display and output the equipped place of each base transceiver system or the cell area thereof (what extent of largeness the cell area has) on a map according to the stored contents of the database 101.

Subsequently, in case, among the base transceiver systems that have been searched in the above-described way, there has been a base transceiver system that has been determined as being provided (bought by or rented to the communication service company) with respect thereto, the base transceiver system providing person operates as follows. Namely, this person, through the use of the register function 105, registers to the database 101 the data for specifying program data set to the base transceiver system or the data for specifying the communication service company to which the base transceiver system is provided, in such a way that that data corresponds to the (number information of) the base transceiver system.

Also, in case there has been a base transceiver system that has been determined as being provided to the communication service company, the following operation occurs. Namely, in that case, through the operation of the download function 107 of the managing system Z, the program data corresponding to the communication system used by the communication service company is transmitted from the memory medium 102 to that base transceiver system via wired lines. Thereby, the program data is loaded down to that base transceiver system and is set thereto.

Incidentally, it is also possible to makeup the following construction as a preferred embodiment. Corresponding to the fact that the data for specifying program data or the data for specifying the communication service company has been registered so as to correspond to the number information of the base transceiver system (i.e. the system that has been determined as being bought by or rented to) through the operation of the register function 105, for example, the download function 107 (automatically) transmits the program data to the base transceiver system (corresponding to the number information) via the wired lines.

It is also possible to make up the following construction as a preferred embodiment. The construction wherein access can be had to the respective functions 101 to 106 of the managing system Z, via the communication lines (in the second embodiment, the Internet lines I), from the (communication service company's) terminal apparatus V that is installed at a long distance from those functions 101 to 106. Thereby, in that terminal apparatus V, it is possible, for example, to make a search for information (the information on the installing place on the map, the information on the cell area, etc.) that concerns the empty base transceiver systems and to look through the searched information pieces.

As described above, in the base transceiver system providing system of the second embodiment, it is managed whether the base transceiver system P1 to PL able to correspond to each of a plurality of communication methods is being utilized (in this embodiment, bought by or rented to) by the communication service company. Then, according to a request made from the communication service company, it is arranged to set a desired communication method to the empty base transceiver system (from among a plurality of settable communication methods). Therefore, it is possible to smoothly offer the from-base-transceiver-system-P1 to PL provided service, thereby enabling the increase in the efficiency of the service provision.

Also, in the base transceiver system providing system of the second embodiment, the installing places of the respective base transceiver systems P1 to PL or the cell areas thereof are displayed. Thereby, they are visually understood by the communication service company, etc. that wants to utilize the system. Therefore, it is possible to more smoothly offer the from-base-transceiver-system P1 to PL provided service.

Also, in the base transceiver system providing system, for example, in the (managing system Z's) memory medium 102 that is provided at a place which is remote from the respective base transceiver systems P1 to PL, there are stored a plurality of program data corresponding to various types of communication methods. Thereby, when the occasion has demanded, the program data corresponding to a desired one of the communication methods can be (automatically) transmitted and set to a desired one of the base transceiver systems via the wired lines W1 to WL. Thereby, it is possible to more smoothly offer the from base-transceiver-system P1 to PL provided service.

Here, in the second embodiment, the function that is performed by the database 101 constitutes base transceiver system information memory means referred to in the present invention.

Also, in the second embodiment, the search function 103 constitutes search means referred to in the present invention. The register function 105 constitute register means referred to in the present invention. Also, the communication function 106 or download function 107 constitutes program data setting means referred to in the present invention.

Also, in the second embodiment, the display function 104 constitutes display means or display control means referred to in the present invention.

Also, in the second embodiment, the function that is performed by the memory medium 102 constitutes program data memory means referred to in the present invention. It is to be noted that the memory medium 102 of this embodiment is connected to each of the base transceiver systems P1 to PL via the communication function 106, the download function 107, or the wired lines W1 to WL.

Here, the construction of each of the CDMA base transceiver system and base transceiver system providing system according to the present invention, or the type of the method of setting program data according to the present invention, is not necessarily limited to the one that has been described above. The present invention permits the use of various other constructions or types.

Also, the field that the present invention is applied to is not necessarily limited to the one that has been referred to above. The present invention enables the application thereof to various other fields.

Also, when executing various kinds of processing through the use of the CDMA base transceiver system or the base transceiver system providing system or the program data setting method according to the present invention, the following constructions may be adopted. Namely, for example, the hardware resources equipped with a processor, memory, etc. may be constructed so that various kinds of processing can be controlled by the processor executing the control programs stored in the ROM. Alternatively, for example, the respective function means for executing the pieces of processing may be constructed as independent hardware circuits.

Also, the present invention can also be implemented as computer-readable recording media such as a floppy disk, CD-ROM, etc. each having stored therein the above-described control programs. Namely, these control programs are input from a recording medium into the computer to thereby cause the processor to execute each of the control programs. By doing so, it is possible to execute the necessary pieces of processing according to the present invention.

As has been explained above, according to the CDMA base transceiver system or program data setting method of the present invention, there is the following construction. Namely, the construction that is equipped with a base band part which is constructed by using an FPGA for processing a chip-rate signal through the use of FPGA program data or a DSP for processing a symbol rate signal through the use of DSP program data. Thereby, in that construction, the FPGA program data that is used by the FPGA and the DSP program data that is used by the DSP can be changed to program data that corresponds to a different type of communication method. Therefore, it is possible to achieve the increase in the efficiency of signal processing through the use of the construction based on the use of the FPGA and the DSP. Simultaneously, it is possible to execute signal processing corresponding to each of various types of communication methods through the use of the FPGA or the DSP.

Furthermore, in the base transceiver system providing system according to the present invention, for example, program data is set that corresponds to the communication method which is selected from among a plurality of communication methods. Thereby, regarding a plurality of base transceiver systems performing wireless communications with the use of that selected communication method, the providing system stores information therein pertaining to whether a relevant one of those base transceiver systems is being utilized by the communication service company. In case there exists, for example, a communication service company wanting to utilize the empty base transceiver system, a search is performed for the empty base transceiver system (i.e. the one that is not being utilized by any communication service company). In addition, according to a request that is made from the communication service company wanting to utilize the searched base transceiver system, the stored contents that regard the base transceiver system are changed to those indicating that this base transceiver system is being utilized. On the other hand, the program data corresponding to the communication method that the communication service company utilizes is set to the relevant base transceiver system. Therefore, it is possible to smoothly perform provision of the service of the base transceiver system and thereby to achieve the increase in the efficiency of the service.

What is claimed is:

1. A CDMA base transceiver system operable to perform wireless communications by using a CDMA method, said CDMA base transceiver system comprising:
   an FPGA operable to process a signal at a chip rate by using FPGA program data;
   a DSP operable to process a signal at a symbol rate by using DSP program data;
   program data setting means for setting the FPGA program data used by said FPGA and the DSP program data used by said DSP; and
   memory connection means for connecting to an external memory; wherein:
   said program data setting means sets the program data by reading the program data stored in the external memory connected to said memory connection means; wherein:
   a base band part is constructed by using said FPGA and DSP;
   FPGA configuration data is used as the FPGA program data;
   DSP firmware is used as the DSP program data;
   said FPGA comprises,
      a searcher part which includes a matched filter, a profile memory bank, and a path detection part,
      a finger part which includes a plurality of signal processing systems disposed in said finger part, each of said plurality of signal processing systems being respectively constituted by a correlator and a memory,
      a diffusion code generation part, and
      a diffusion modulation part;
   said DSP comprises
      a pilot synchronous detection part constituted in said searcher part,
      a plurality of synchronous detection parts constituting a plurality of said signal processing systems disposed in said finger part, the number of said plurality of synchronous detection parts being equal to the number of said plurality of signal processing systems,
      a composer part,
      a physical frame separation part,
      a decoder part,
      a coder part,
      a physical frame multiplexing part, and
      a transmission frame generation part;
   in said searcher part
      said matched filter is operable to obtain a correlation value between a reception signal and a diffusion code while making the timings with which multiplication between the reception signal and the diffusion code is performed different from each other;
      said pilot synchronous detection part is operable to perform synchronous detection of a pilot signal by using the correlation value obtained by said matched filter;
      said profile memory bank is operable to store the correlation value obtained by said matched filter and the synchronous-detected result obtained by said pilot synchronous detection part; and
      said path detection part is operable to detect the path of the reception signal by using the obtained correlation value and the obtained synchronous-detected result;
   in each of said respective signal processing systems disposed in said finger part,
      said correlator is operable to, for each detected path detected by said search part, perform multiplication between the reception signal and the diffusion code so as to perform inverse diffusion and thereby obtain a correlation value between the reception signal and the diffusion code;
      said memory is operable to store the correlation value obtained by said correaltor; and
      said synchronous detection part is operable to perform synchronous detection of the post-inverse-diffusion reception signal according to the correlation value stored in said memory;
   said composer is operable to compose the synchronous-detected results, corresponding to a plurality of paths, inputted from said finger part, to output the composed result as a final reception signal to said physical frame separation part, to detect a signal power/interference power ratio with regard to the composed result, to generate, according to the detected signal power/interference power ratio, a transmission power control bit for controlling a transmission power, and to output the generated transmission power control bit to said transmission frame generation part;

said physical frame separation part is operable to perform separation of physical channels with respect to the reception signal inputted from said composer part and to output the post-separation reception signal to said decoder part;

said decoder part is operable to perform de-interleave processing or error correction decoding with respect to the reception signal inputted from said physical frame separation part;

said coder part is operable to perform interleave processing or error correction coding with respect to the transmission signal and to output the post-processing transmission signal to said physical frame multiplexing part;

said physical frame multiplexing part is operable to perform mapping into physical channels with respect to the post-processing transmission signal inputted from said coder part and to output the post-mapping transmission signal to said transmission frame generation part;

said transmission frame generation part is operable to generate, by using the post-mapping transmission signal inputted from said physical frame multiplexing part, a transmission frame, to output the generated transmission frame to said diffusion modulation part, and to control the transmission power according to the transmission power control bit inputted from said composer part;

said diffusion code generation part is operable to generate a diffusion code and to output the generated diffusion code to said diffusion modulation part; and said diffusion modulation part is operable to perform diffusion modulation of the transmission frame inputted from said transmission frame generation part by using the diffusion code inputted from said diffusion code generation part.

2. A base transceiver system providing system comprising:

base transceiver system information storage means for storing, regarding a plurality of base transceiver systems each having program data set therein corresponding to a communication system selected from among a plurality of communication systems and thereby performing wireless communications through the use of the selected communication method, information concerning whether each of the plurality of base transceiver systems is being utilized by a communication service company;

search means for, according to the stored contents of said base transceiver system information storage means, searching for a base transceiver system from among the plurality of base transceiver systems which is not being utilized by a communication service company;

register means for, according to a request made from the communication service company wanting to utilize the base transceiver system searched by said search means, changing the stored contents of said base transceiver system information storage means with regard to the base transceiver system to indicate that the base transceiver system is being utilized by the communication service company; and program data setting means for setting, to the base transceiver system, the program data corresponding to the communication method that the communication service company utilizes.

3. A base transceiver system providing system according to claim 2, wherein:

said base transceiver system information storage means further stores information therein regarding a place of installation of each base transceiver system and information regarding a cell area of each base transceiver system; and said base transceiver providing system further comprises display means for displaying/outputting information, and display control means for causing the place of installation and the cell area of the base transceiver system to be displayed on a map by said display means according to the stored contents of said base transceiver system information storage means.

4. A base transceiver system providing system according to claim 2, further comprising program data storage means for storing program data, said program data storage means being connected to the base transceiver system via relevant lines, wherein said program data setting means transmits, according to a change that has occurred due to an operation of said register means, the program data stored in said program data storage means to the base transceiver system via the relevant lines to thereby set the transmitted program data to the base transceiver system.

5. A base transceiver system providing system according to claim 3, further comprising program data storage means for storing program data, said program data storage means being connected to the base transceiver system via the relevant lines, wherein said program data setting means transmits, according to a change that has occurred due to an operation of said register means, the program data stored in said program data storage means to the base transceiver system via the relevant lines to thereby set the transmitted program data to the base transceiver system.

* * * * *